US009281986B2

(12) United States Patent
Hasegawa

(10) Patent No.: US 9,281,986 B2
(45) Date of Patent: Mar. 8, 2016

(54) TRANSMISSION APPARATUS, RECEPTION APPARATUS, AND RELAY APPARATUS

(75) Inventor: Fumihiro Hasegawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 389 days.

(21) Appl. No.: 13/823,149

(22) PCT Filed: Aug. 30, 2011

(86) PCT No.: PCT/JP2011/069656
§ 371 (c)(1),
(2), (4) Date: Mar. 14, 2013

(87) PCT Pub. No.: WO2012/049912
PCT Pub. Date: Apr. 19, 2012

(65) Prior Publication Data
US 2013/0170524 A1    Jul. 4, 2013

(30) Foreign Application Priority Data

Oct. 14, 2010  (JP) ................................. 2010-231841

(51) Int. Cl.
*H04L 27/26* (2006.01)

(52) U.S. Cl.
CPC ........ *H04L 27/2615* (2013.01); *H04L 27/2621* (2013.01)

(58) Field of Classification Search
CPC ............ H04L 27/2615; H04L 27/2621; H04L 27/2614; H04L 27/2601; H04L 27/2634
USPC ......... 370/310, 345, 347, 431, 442, 464, 498, 370/535, 536, 537
See application file for complete search history.

(56) References Cited

U.S. PATENT DOCUMENTS

| 2002/0191709 A1* | 12/2002 | Hunton ......................... 375/295 |
| 2003/0202611 A1* | 10/2003 | Montojo et al. ............... 375/260 |
| 2005/0265226 A1* | 12/2005 | Shen et al. .................... 370/210 |
| 2009/0080454 A1 | 3/2009 | Koyanagi |
| 2009/0190685 A1 | 7/2009 | Kimura |
| 2009/0207931 A1 | 8/2009 | Ohwatari et al. |

FOREIGN PATENT DOCUMENTS

| JP | 10 126331 | 5/1998 |
| JP | 2007 195129 | 8/2007 |

(Continued)

OTHER PUBLICATIONS

Japanese Office Action issued Aug. 27, 2013, in Japan Patent Application No. 2012-538600 (with English translation).

(Continued)

*Primary Examiner* — Obaidul Huq
(74) *Attorney, Agent, or Firm* — Oblon, McClelland, Maier & Neustadt, L.L.P.

(57) ABSTRACT

A transmission apparatus included in a communication system together with a reception apparatus and configured to multiplex data from M (M is a natural number equal to or larger than 2) channels and transmit the data to the reception apparatus. The transmission apparatus includes M timing offset units configured to respectively receive inputs of the data from the different channels and insert designated timing offset values in the input data, a multiplexing unit configured to multiplex the M data subjected to the timing offset and output a multiplexed signal, and a timing-offset calculating unit configured to calculate different timing offset values for the respective M timing offset units and output the calculated timing offset values to the respective timing offset units.

32 Claims, 17 Drawing Sheets

(56) References Cited

FOREIGN PATENT DOCUMENTS

| JP | 2008 78944 | 4/2008 |
|---|---|---|
| JP | 2009 182649 | 8/2009 |
| JP | 2009 194732 | 8/2009 |
| WO | 2007 007673 | 1/2007 |

OTHER PUBLICATIONS

Suyama, S., et al., "Subcarrier Phase Hopping MIMO-OFDM Transmission employing Enhanced Selected Mapping for PAPR Reduction," IEEE International Symposium on Perdon, Inddor and Mobile Radio Communications, Total 5 Pages, (Sep. 14, 2006).

Kawamura, T., et al., "Investigation on Peak Power Reduction Effect Employing Clipping and Filtering in LTE-Advanced Uplink," IEICE, Total 1 Page, (2010) (with partial English translation).

International Search Report Issued Oct. 4, 2011 in PCT/JP11/069656 Filed Aug. 30, 2011.

Office Action issued Apr. 1, 2015 in Canadian Patent Application No. 2,814,485.

Canadian Office Action issued Dec. 23, 2015 in Canadian Patent Application No. 2,814,485.

* cited by examiner

FIG.2
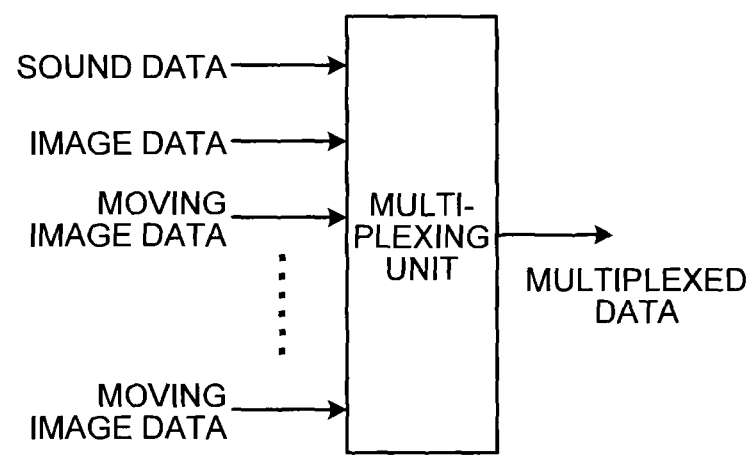
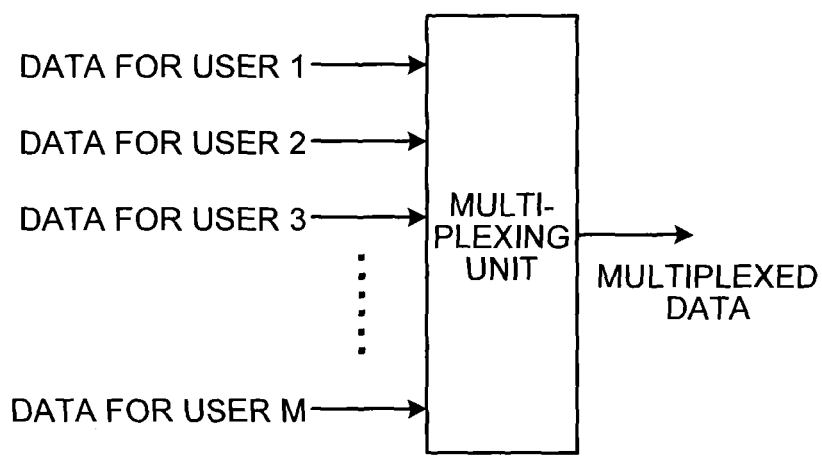

1

TRANSMISSION APPARATUS, RECEPTION APPARATUS, AND RELAY APPARATUS

FIELD

The present invention relates to a transmission apparatus that performs multichannel transmission.

BACKGROUND

In a digital communication system in the past, frequency selectivity and time fluctuation of a transmission line are caused by multipath fading that occurs when a transmission signal reflects on a building or the like and Doppler fluctuation that occurs because of movement of a terminal. In such a multipath environment, a received signal is a signal in which a transmission symbol and a delayed symbol, which arrives after a delay time elapses, interfere with each other.

As a method of obtaining a best reception characteristic in a transmission line having frequency selectivity, a single carrier transmission system attracts attention in recent years. For an increase in a volume of transmission data, there is an increasing necessity for multichannel transmission in which a single carrier is used. The multichannel transmission is a technology for simultaneously transmitting several channels or several different data sequences. For example, when the number of channels is represented as M, data for M users or M kinds (sound, image, moving image, etc.) of data are simultaneously transmitted. When the method of the multichannel transmission is used in this way, it is possible to simultaneously transmit data to a large number of users or simultaneously provide various services.

In the multichannel transmission in which a plurality of signals are multiplexed, there is a problem in that a PAPR (Peak to Average Power Ratio) value is high. In general transmission, for example, Patent Literature 1 described below discloses a technology for suppressing peak power in a communication system for a single carrier. Patent Literature 2 described below discloses a technology for changing a phase for each signal and suppressing peak power in another communication system different from the multichannel transmission. Patent Literature 3 described below discloses a technology for selecting a precoder that suppresses transmission peak power in a MIMO (Multiple Input Multiple Output) communication system.

CITATION LIST

Patent Literature

Patent Literature 1: Japanese Patent Application Laid-Open No. 2008-78944
Patent Literature 2: WO2007/007673
Patent Literature 3: Japanese Patent Application Laid-Open No. 2009-182649

SUMMARY

Technical Problem

However, according to the technologies in the past, it is impossible to perform peak suppression when a multichannel signal is transmitted. Therefore, there is a problem in that it is impossible to reduce a PAPR value during the multichannel signal transmission.

The present invention has been devised in view of the above and it is an object of the present invention to obtain a transmission apparatus that can reduce a PAPR value during multichannel transmission.

Solution to Problem

In order to solve the above problem and in order to attain the above object, in a transmission apparatus included in a communication system together with a reception apparatus and configured to multiplex data from M (M is a natural number equal to or larger than 2) channels and transmit the data to the reception apparatus, the transmission apparatus of the present invention includes: M timing offset units configured to respectively receive inputs of the data from the different channels and insert designated timing offset values in the input data; a multiplexing unit configured to multiplex the M data subjected to the timing offset and output a multiplexed signal; and a timing-offset calculating unit configured to calculate, based on a value known in the communication system, different timing offset values for the respective M timing offset units and output the calculated timing offset values to the respective timing offset units.

Advantageous Effects of Invention

According to the present invention, there is an effect that it is possible to reduce a PAPR value during multichannel transmission.

BRIEF DESCRIPTION OF DRAWINGS

FIG. 2 is a diagram of an example of multiplex transmission.

DESCRIPTION OF EMBODIMENTS

A transmission apparatus according to Embodiments of the present invention is explained in detail below based on the drawings. The present invention is not limited by the embodiments.

First Embodiment.

Figure 1:
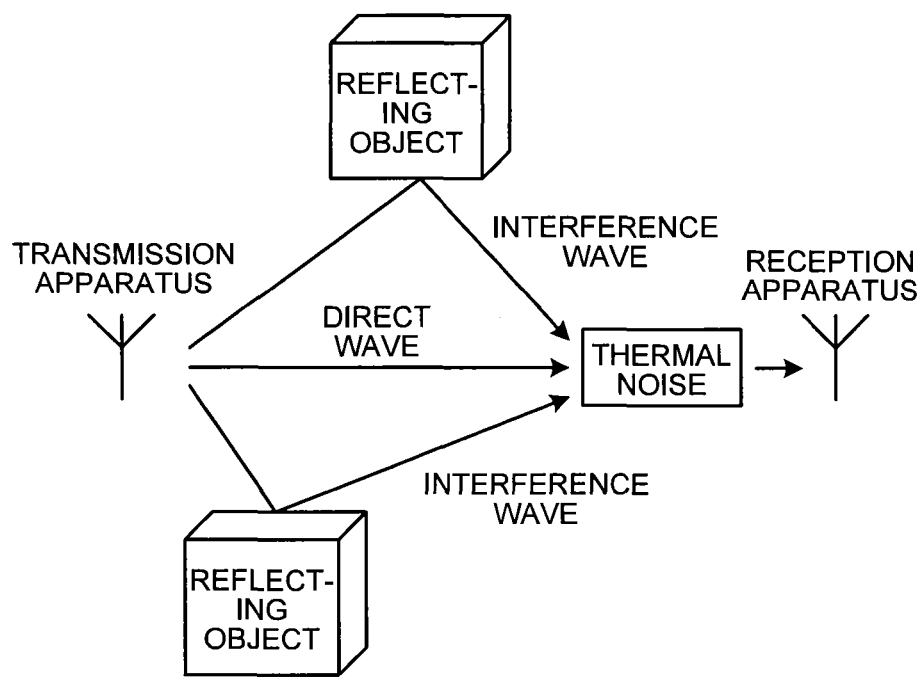
FIG. 1 is a diagram of a multipath environment.

First, an environment in which a communication system including a transmission apparatus and a reception apparatus in a first embodiment is used is briefly explained. FIG. 1 is a diagram of a multipath environment in which the communication system is arranged. When the transmission apparatus transmits a signal in the multipath environment, the reception apparatus receives the signal as thermal noise in which a direct wave from the transmission apparatus and an interference wave reflected from a reflecting object are multiplexed.

There is a single carrier transmission system for obtaining a best reception characteristic in such a case. However, for an increase in a volume of transmission data, there is a multichannel transmission system in which a single carrier is used. FIG. 2 is a diagram of an example of multiplex transmission in multichannel transmission. As shown in FIG. 2, when the number of channels is represented as M (M is a natural number equal to or larger than 2), M kinds of data or data for M users are multiplexed in a multiplexing unit and simultaneously transmitted as multiplexed data. In this embodiment, a transmission apparatus is explained that can reduce a PAPR value when multiplexed data (a multiplexed signal) obtained by multiplexing data is transmitted.

Figure 3:
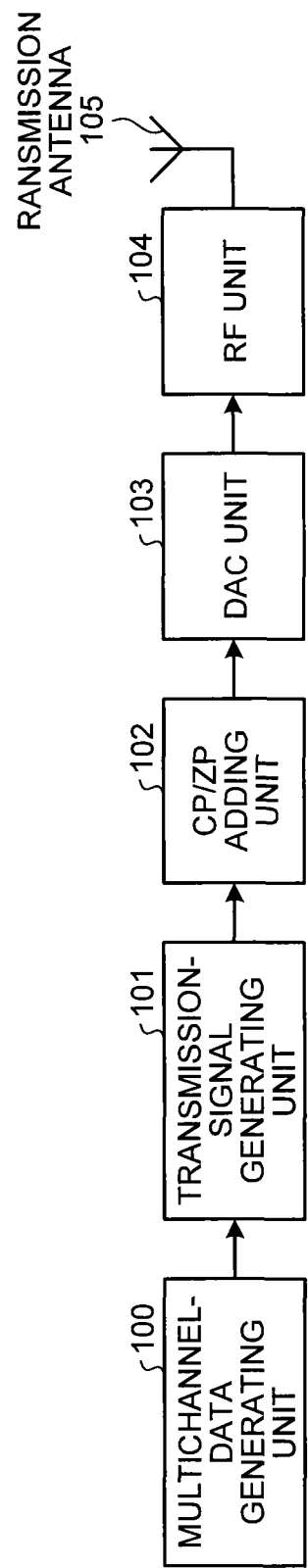
FIG. 3 is a diagram of a configuration example of a transmission apparatus.

FIG. 3 is a diagram of a configuration example of the transmission apparatus. The transmission apparatus includes a multichannel-data generating unit 100, a transmission-signal generating unit 101, a CP/ZP (Cyclic Prefix/Zero Padding) adding unit 102, a DAC (Digital to Analog Converter) unit 103, an RF (Radio Frequency) unit 104, and a transmission antenna 105.

The multichannel-data generating unit 100 generates a plurality of data to be transmitted. The transmission-signal generating unit 101 receives an input of the data generated by the multichannel-data generating unit 100 and, after performing processing for reducing a PAPR value, outputs a multiplexed signal (a transmission signal) obtained by multiplexing the data. The CP/ZP adding unit 102 adds a CP (Cyclic Prefix) or zero insertion (ZP: Zero Padding) to the transmission signal according to necessity. The DAC unit 103 converts the transmission signal from a digital signal into an analog signal. The RF unit 104 up-converts the transmission signal converted into the analog signal. The transmission antenna 105 transmits the up-converted transmission signal to the reception apparatus.

The operation of the transmission apparatus is explained. In the transmission apparatus, first, the multichannel-data generating unit 100 generates a plurality of data to be transmitted. The multichannel-data generating unit 100 outputs the generated data to the transmission-signal generating unit 101 from different channels. The transmission-signal generating unit 101 applies processing for reducing a PAPR value to the data generated by the multichannel-data generating unit 100 and multiplexes the data to generate a transmission signal. Details of the processing for reducing a PAPR value is explained below.

In the multichannel-data generating unit 100, a data generating method used from the past can be used. Any signal point and any mapping method can be used. In general, as a modulation system, PSK (Phase Shift Keying), QAM (Quadrature Amplitude Modulation), or the like is used.

It is also possible to use data encoded using an error correction code or the like or spread-encoded data such as CDMA (Code Division Multiple Access) disclosed in a literature 'R. Prasad et al, "An overview of CDMA evolution toward wideband CDMA", IEEE Commun. Surveys & tutorials, vol. 1, no. 1, Fourth Quarter 1998, pp. 2 to 29.'

Figure 4:
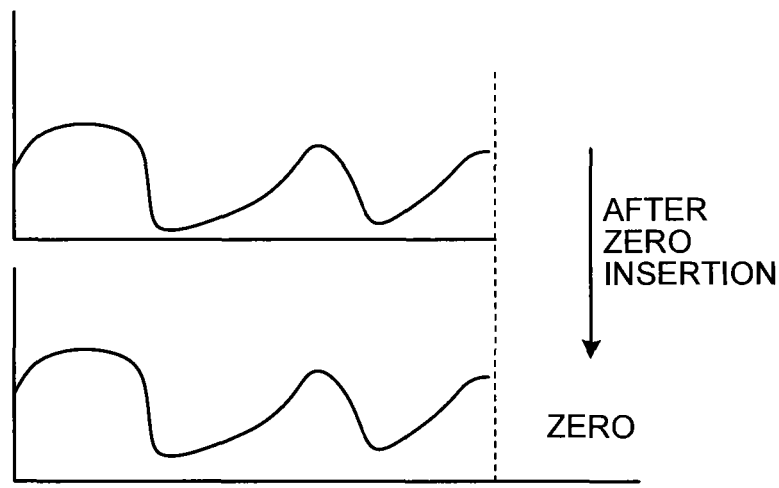
FIG. 4 is a diagram of an implementation example of a ZP.
Figure 5:
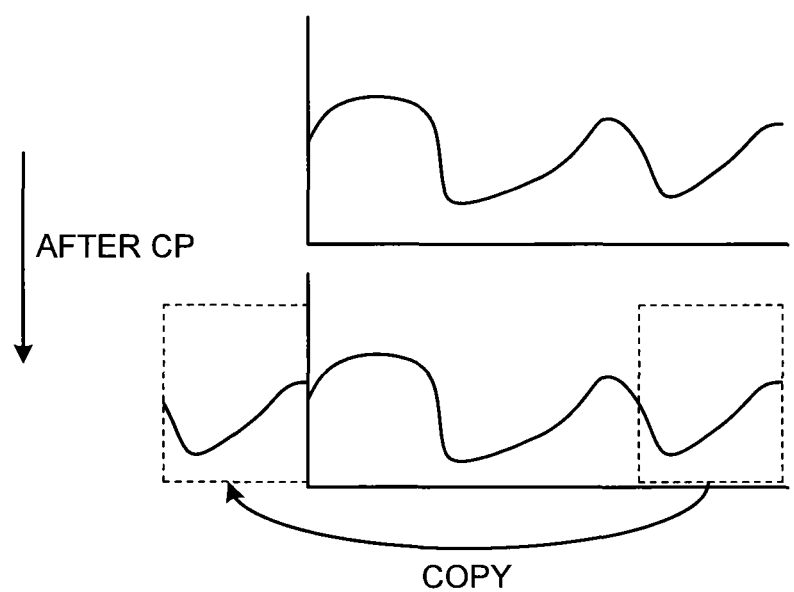
FIG. 5 is a diagram of an implementation example of a CP.

Subsequently, the CP/ZP adding unit 102 adds a CP or zero insertion to the transmission signal according to necessity. FIG. 4 is a diagram of an implementation example of the ZP. FIG. 5 is a diagram of an implementation example of the CP. The ZP is a method of inserting zero in the beginning or the end of data. The CP is a method of copying several symbols in the beginning (the end) of data to the end (the beginning) of the data. In general, the CP and the ZP are processing performed to prevent a reception characteristics from being deteriorated in a multipath fading transmission line. Therefore, if it is unlikely that the reception characteristic is deteriorated, it is unnecessary to perform the CP and the ZP. The CP and the ZP explained herein can be processing equivalent to the processing in the past.

The DAC unit 103 converts the signal input from the CP/ZP adding unit 102 from a digital signal into an analog signal. The RF unit 104 up-converts the digital signal and transmits a transmission signal from the transmission antenna 105. Processing by the DAC unit 103 and processing by the RF unit 104 are processing equivalent to the processing in the past.

Figure 6:
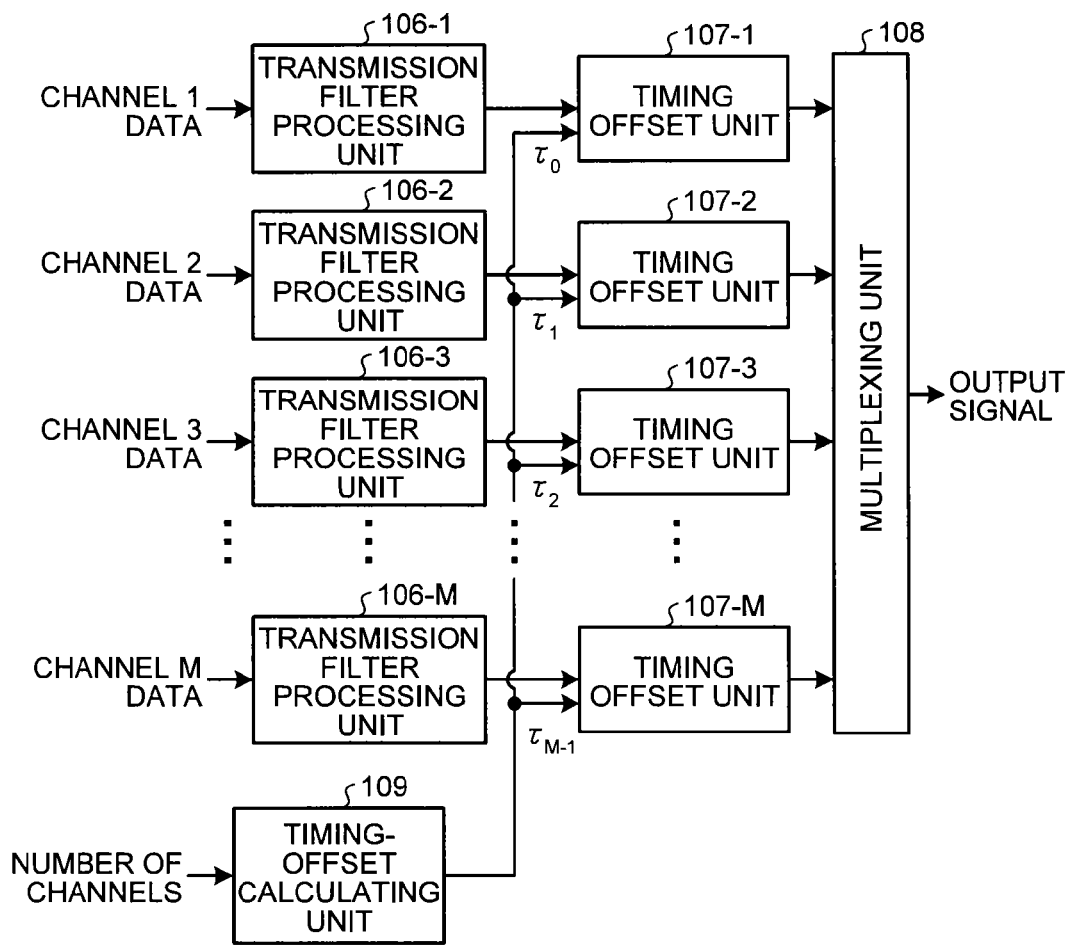
FIG. 6 is a diagram of a configuration example of a transmission-signal generating unit.

Subsequently, processing for performing the processing for reducing a PAPR value and multiplexing and outputting data in the transmission-signal generating unit 101 is explained. FIG. 6 is a diagram of a configuration example of the transmission-signal generating unit 101. The transmission-signal generating unit 101 includes transmission filter processing units 106-1 to 106-M, timing offset units 107-1 to 107-M, a multiplexing unit 108, and a timing-offset calculating unit 109. In the following explanation, as an example, the multichannel-data generating unit 100 generates M (M is a natural number equal to or larger than 2) data and outputs the data from M channels.

Each of the transmission filter processing units 106-1 to 106-M applies filter processing to one data input from the multichannel-data generating unit 100. The timing offset units 107-1 to 107-M insert, in the data subjected to the filter processing, timing offset values input from the timing-offset calculating unit 109. The multiplexing unit 108 multiplexes and outputs M signals subjected to the timing offset. The timing-offset calculating unit 109 calculates, based on information concerning the number of channels, values that the timing offset units 107-1 to 107-M should subject to the timing offset and outputs the values.

The operation of the transmission-signal generating unit 101 is explained. First, the transmission filter processing units 106-1 to 106-M receive inputs of channel data from the channels, apply the filter processing to the channel data, and output data. The filter processing can be the general processing in the past.

Figure 7:
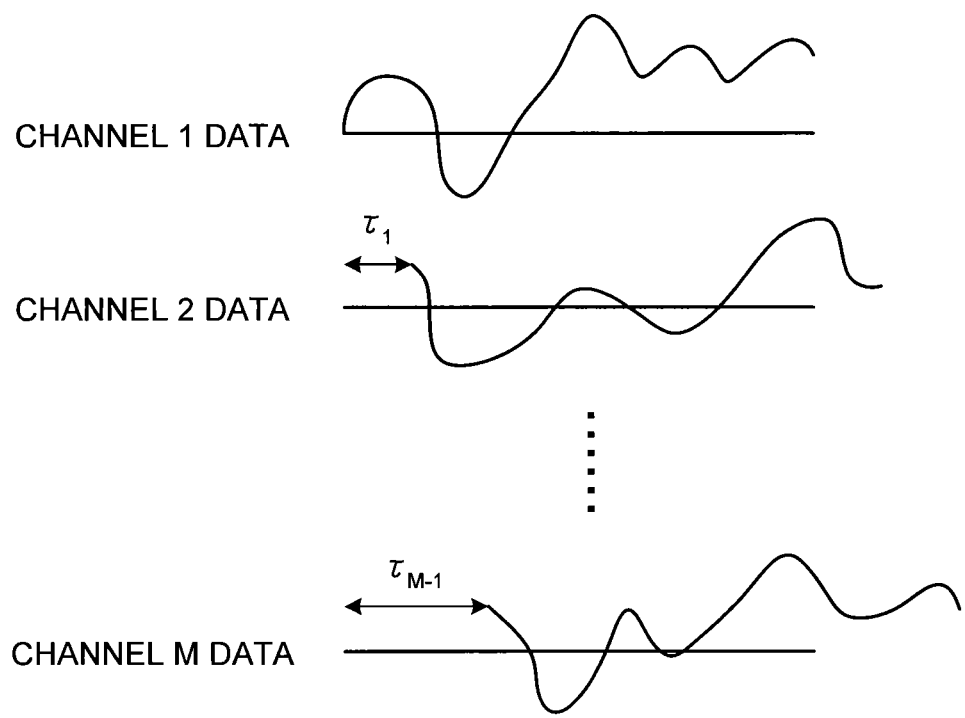
FIG. 7 is a diagram of a timing offset insertion example.

The timing-offset units 107-1 to 107-M insert the timing offset values in the data subjected to the filter processing. In this embodiment, a method of directly inserting the timing offset values in time domains is used. FIG. 7 is a diagram of a timing offset insertion example. Different timing offset values are inserted for the respective channels. As shown in FIG. 7, timing offset value does not have to be inserted concerning one data among a plurality of (M) data.

In the time domains, when the timing offset units 107-1 to 107-M insert the timing offset values, it is possible to insert a CP or a ZP in a shifted portion. However, if it is unlikely that a reception characteristic and a demodulation characteristic are deteriorated, it is unnecessary to add a CP or a ZP.

The multiplexing unit 108 multiplexes the data in which the timing offset values are inserted and outputs the data to the CP/ZP adding unit 102 at the post stage as one multiplexed signal (transmission signal).

Figure 8:
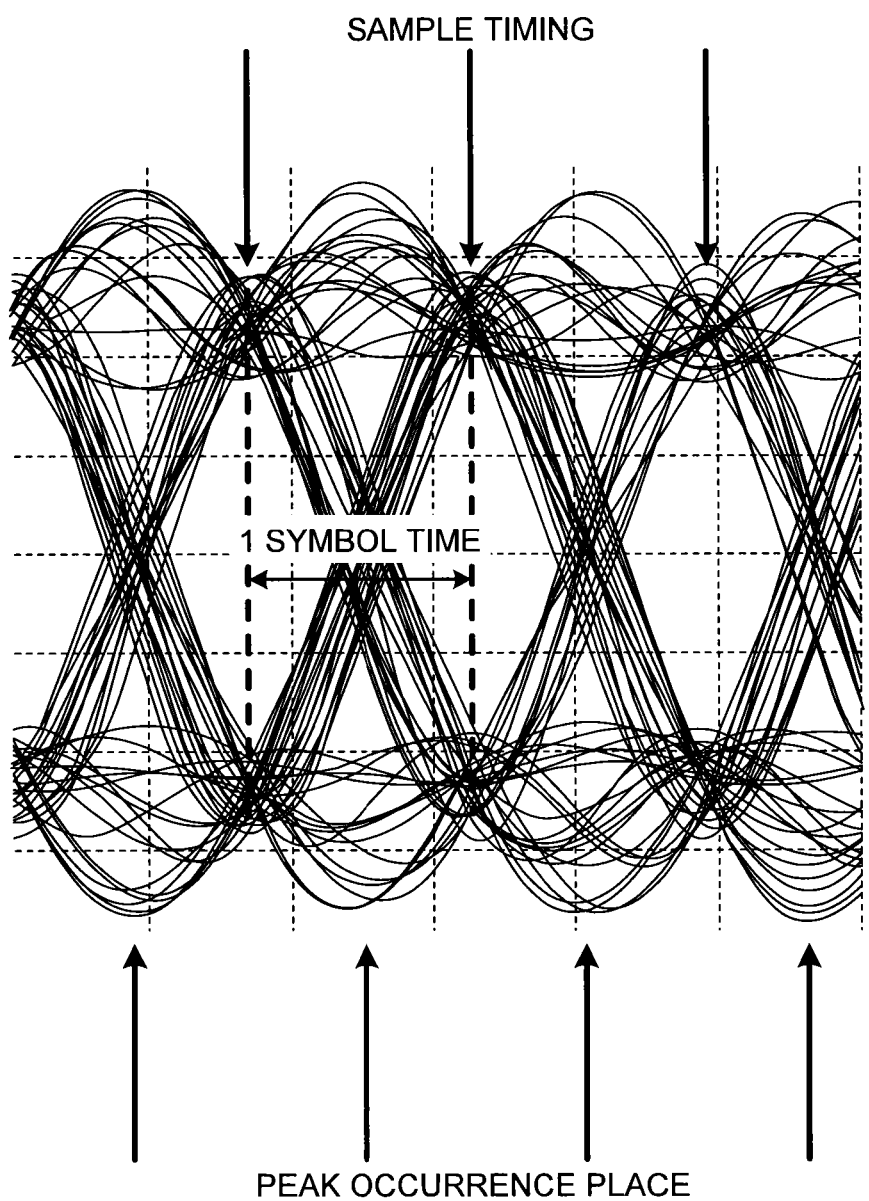
FIG. 8 is a diagram of an eye pattern of a QPSK signal.

A principle that a PAPR value of the multiplexed signal can be reduced by inserting different timing offset values to respective data is explained. As an example, an eye pattern of a QPSK (Quadrature Phase Shift Keying) signal is shown in FIG. 8. As it can be understood from FIG. 8, in a single carrier signal, a peak of electric power tends to occur in a place between symbol times in the time domains. In other words, when single carrier signals are multiplexed, because peak occurrence places of the single carrier signals are the same, the peak occurrence places overlap and peak power of an output signal further increases.

Therefore, to shift the peak power occurrence places and reduce a PAPR value, the transmission-signal generating unit 101 inserts different timing offset values to data of respective channels and prevents the overlap of the peak occurrence places.

For example, in the case of two-channel transmission, a signal of a second channel is transmitted while being shifted by offset equivalent to 0.5 symbol time. In the case of four-channel transmission, a signal of a second channel is shifted by offset equivalent to 0.25 symbol time, a signal of a third channel is shifted by offset equivalent to 0.5 symbol time, and a signal of a fourth channel is shifted by offset equivalent to 0.75 symbol time.

The timing-offset calculating unit 109 calculates timing offset values for shifting the timings of the respective channels in this way and outputs the timing offset values to the timing offset units 107-1 to 107-M. The timing offset units 107-1 to 107-M insert the received timing offset values in the respective data. Consequently, it is possible to reduce a PAPR value of a multiplexed signal.

The timing offset values can be determined freely. In the transmission-signal generating unit 101 shown in FIG. 6, an input value to the timing-offset calculating unit 109 is the number of channels (M). However, the input value is not limited to this. For example, the timing offset values can be set to values suitable for parameters of a transmission filter, the number of oversamples in not-shown oversampling processing, and the number of symbols included in the respective data.

At this point, the timing-offset calculating unit 109 calculates transmission timing shift values (timing offset values) based on known parameters set by the communication system including the transmission apparatus and the reception apparatus such as the number of channels, the parameters of the transmission filter, the number of oversamples, and the number of symbols. Consequently, the reception apparatus can store the parameters in the communication system in a memory in advance. On the transmission apparatus side, because it is unnecessary to notify information concerning timing offset values every time timing offset is performed, it is possible to reduce a PAPR value while reducing consumption of a radio band.

As explained above, in this embodiment, in the transmission apparatus, the timing-offset calculating unit 109 calculates, based on the parameters known in the communication system, calculates different timing offset values for a plurality of channels. The timing offset units 107-1 to 107-M insert the timing offset values in respective channel data. The multiplexing unit 108 multiplexes signals after the timing offset value insertion to generate a transmission signal. Consequently, it is possible to shift a peak power occurrence place in the transmission signal of multichannel transmission. Therefore, it is possible to reduce a PAPR value of the transmission signal compared with a PAPR value of a transmission signal obtained when the timing offset values are not inserted.

Second Embodiment.

In a second embodiment, a PAPR value of a transmission signal at the current timing offset values is measured and timing offset values are calculated using information concerning the PAPR value. Differences from the first embodiment are explained.

Figure 9:
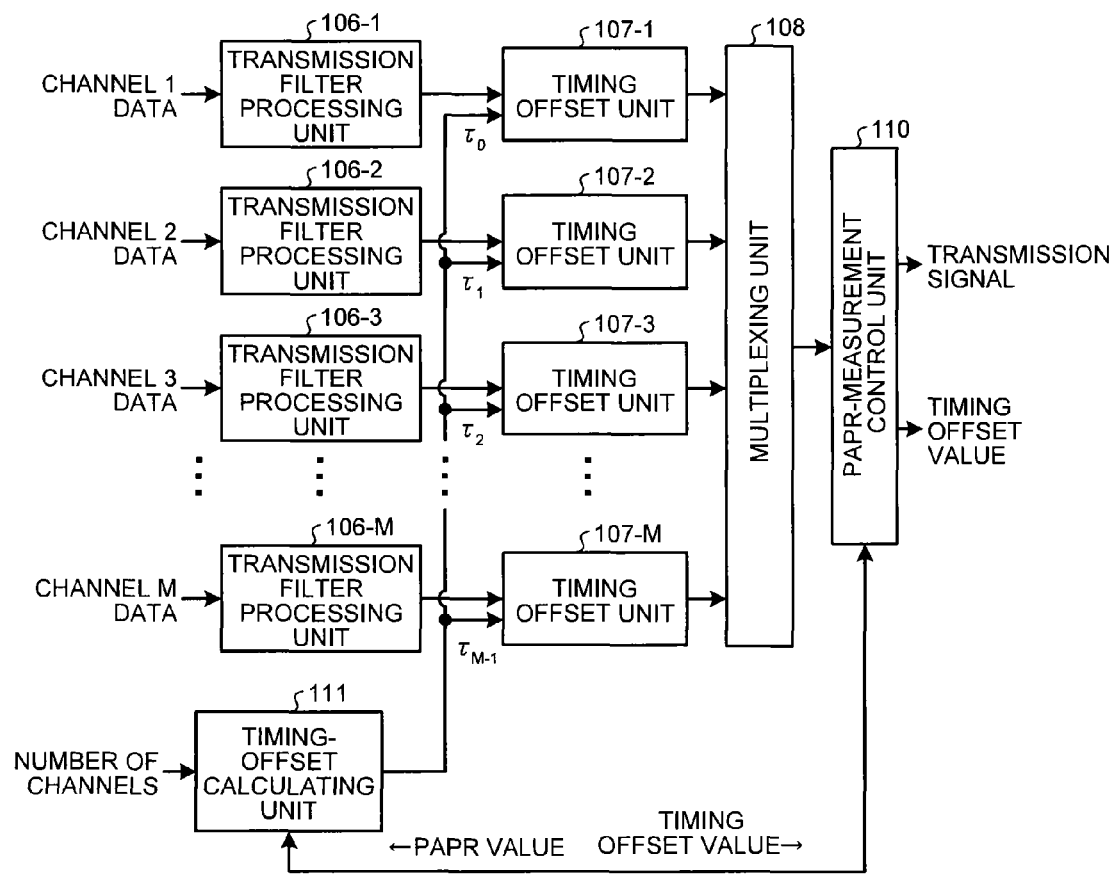
FIG. 9 is a diagram of a configuration example of a transmission-signal generating unit.

FIG. 9 is a diagram of a configuration example of the transmission-signal generating unit 101. The transmission-signal generating unit 101 includes the transmission filter processing units 106-1 to 106-M, the timing offset units 107-1 to 107-M, the multiplexing unit 108, a PAPR-measurement control unit 110, and a timing-offset calculating unit 111.

The PAPR-measurement control unit 110 measures a PAPR value of a multiplexed transmission signal and notifies the timing-offset calculating unit 111 of the PAPR value. The timing-offset calculating unit 111 calculates, based on information concerning the number of channels and the PAPR value, timing offset values for the timing offset units 107-1 to 107-M and outputs the timing offset values.

In this embodiment, the PAPR-measurement control unit 110 measures a PAPR value of a transmission signal and notifies the timing-offset calculating unit 111 of the PAPR value. The timing-offset calculating unit 111 calculates, based on the number of channels and the PAPR value, timing offset values with which the PAPR value is minimized.

The timing offset values sometimes depend on data. Therefore, the PAPR-measurement control unit 110 acquires information concerning timing offset values ($\tau_k$: 0≤k≤M−1) from the timing-offset calculating unit 111 and transmits the information concerning the timing offset values to the reception apparatus together with the transmission signal. There is no limitation concerning a method of transmitting the information concerning the timing offset values. It is possible to transmit the information concerning the timing offset values using another channel or frame different from a channel or a frame for the transmission signal.

Besides the timing offset, it is also possible to apply, in time domains, to channel signals, a phase rotation with which a PAPR value of an output signal is minimized. As in the first embodiment, an input value is not limited to the number of channels. It is also possible to use information concerning parameters of a transmission filter and the number of oversamples.

As explained above, in this embodiment, the timing-offset calculating unit 111 further acquires information concerning the current PAPR value and calculates timing offset values for the timing offset units 107-1 to 107-M to minimize the PAPR value. Consequently, when the PAPR value increases, it is possible to immediately reduce the PAPR value.

Third Embodiment.

In a third embodiment, a reception apparatus included in a communication system together with the transmission apparatus in the first and second embodiment is explained.

Figure 10:
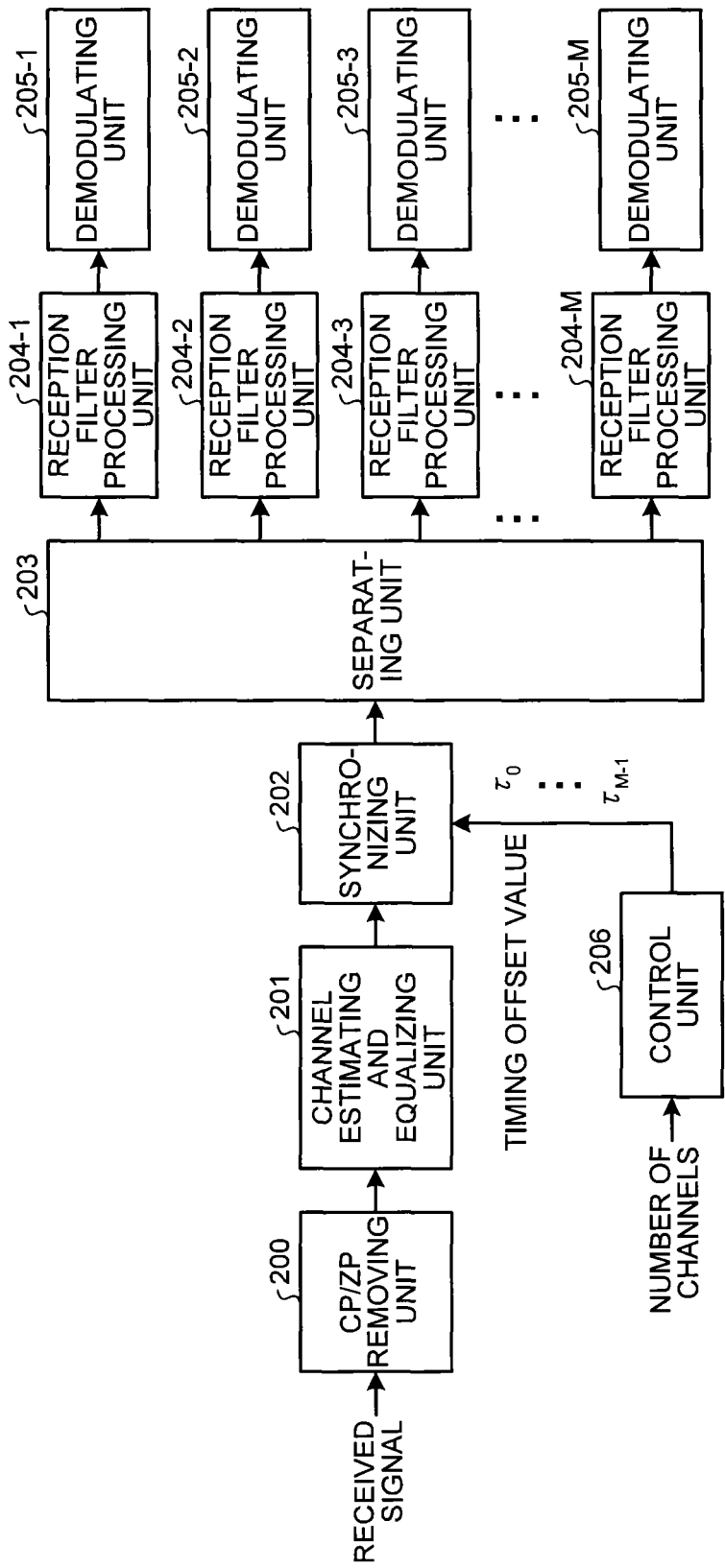
FIG. 10 is a diagram of a configuration example of a reception apparatus.

FIG. 10 is a diagram of a configuration example of the reception apparatus. The reception apparatus includes a CP/ZP removing unit 200, a channel estimating and equalizing unit 201, a synchronizing unit 202, a separating unit 203, reception filter processing units 204-1 to 204-M, demodulating units 205-1 to 205-M, and a control unit 206.

The CP/ZP removing unit 200 removes, from a received signal, a CP or a ZP added by the transmission apparatus. It is assumed that information concerning the added CP or ZP is information known in the communication system in which the reception apparatus is included together with the transmission apparatus. The channel estimating and equalizing unit 201 applies channel estimation and equalization processing to the received signal. The synchronizing unit 202 removes, based on information concerning timing offset values acquired from the control unit 206, timing offset values inserted in respective channels and synchronizes respective channel data. The separating unit 203 separates the received signal into M signals. The reception filter processing units 204-1 to 204-M apply filter processing to the separated signals. The demodulating units 205-1 to 205-M demodulate the signals. The control unit 206 calculates a timing offset signal based on information concerning the number of channels, which is information known in the digital communication system in which the reception apparatus is included together with the transmission apparatus, and outputs the timing offset values to the synchronizing unit 202.

The operation of the reception apparatus is explained. First, the CP/ZP removing unit 200 removes a CP or a ZP from a received signal. The channel estimating and equalizing unit 201 performs channel estimation and equalization processing. The synchronizing unit 202 removes timing offset values of respective channels.

The control unit 206 calculates and outputs a timing offset values for removal used in the synchronizing unit 202. In FIG. 10, the control unit 206 calculates, based on the number of channels, timing offset values using a calculation method same as the calculation method in the transmission apparatus. However, the calculation of timing offset values is not limited to this. As explained in the first and second embodiment, when other known parameters (the parameters of the transmission filter, the number of oversamples, the number of symbols, etc.) are used in the transmission apparatus, the control unit 206 calculates timing offset values using the same kinds of parameters. It is set in advance in the communication system which parameters are used. Consequently, the reception apparatus stores the parameters, which depend on the communication system, in a not-shown memory and refers to the parameters. Therefore, the reception apparatus does not need to acquire information concerning parameters from the transmission apparatus every time the reception apparatus receives a signal.

When the transmission apparatus changes timing offset values as appropriate based on the current PAPR value as in the second embodiment, the control unit 206 can also receive the timing offset values from the transmission apparatus and output the timing offset values every time the transmission apparatus changes the timing offset values. Because the channel data are synchronized based on the actual timing offset values, it is possible to synchronize the channel data at high accuracy.

In the reception apparatus, after the synchronization, the separating unit 203 separates the received signal into respective channel signals. The reception filter processing units 204-1 to 204-M apply reception filter processing to the separated received signals. The demodulating units 205-1 to 205-M demodulate the received signals to obtain the channel data. As a demodulation system, an appropriate demodulation system is used according to an error correction code, a spreading code, and a modulation system used in the transmission apparatus.

As explained above, in this embodiment, in the reception apparatus, the control unit 206 calculates timing offset values based on information same as the information in the transmission apparatus. The synchronizing unit 202 removes the timing offset values from the received signal and synchronizes the channel data. Consequently, in the reception apparatus, it is possible to remove different timing offset values inserted for the respective channels and obtain data generated by the transmission apparatus.

Fourth Embodiment.

In the first and second embodiments, the timing offset is inserted in the time domains. In a fourth embodiment, timing offset is added to channel signals in the time domains by giving a phase rotation to the channel signals in frequency domains.

As an example, timing offset is added to an SC-FDMA (Single Carrier-Frequency Division Multiple Access) signal. Peak power of the SC-FDMA signal is low. The SC-FDMA signal is a technology used in general. It is assumed that M (channels) SC-FDMA signals are multiplexed.

Figure 11:
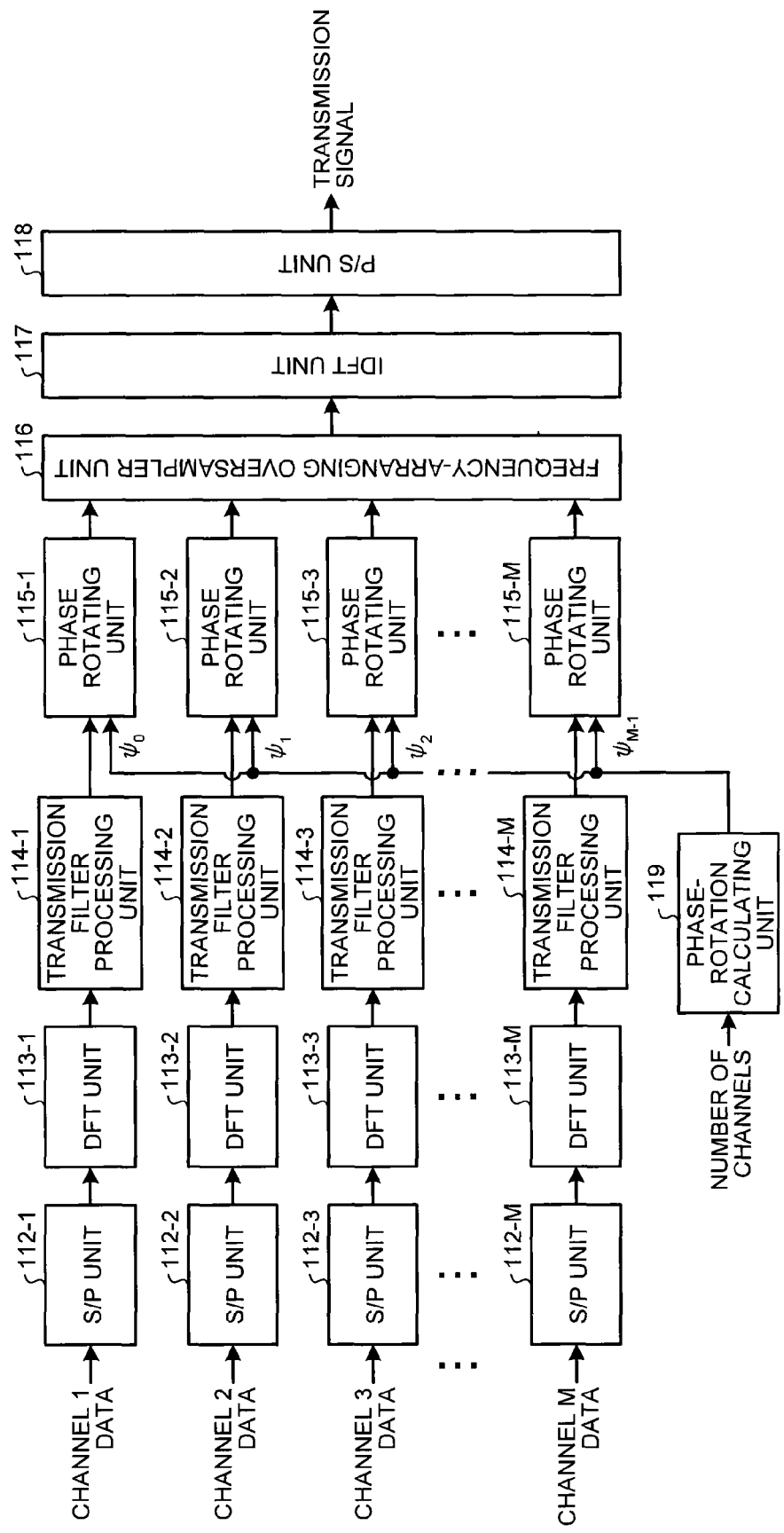
FIG. 11 is a diagram of a configuration example of a transmission-signal generating unit.

FIG. 11 is a diagram of a configuration example of the transmission-signal generating unit 101. The transmission-signal generating unit 101 includes S/P (Serial/Parallel) units 112-1 to 112-M, DFT (Discrete Fourier Transform) units 113-1 to 113-M, transmission filter processing units 114-1 to 114-M, phase rotating units 115-1 to 115-M, a frequency-arranging oversampler unit 116, an IDFT (Inverse Discrete Fourier Transform) unit 117, a P/S (Parallel/Serial) unit 118, and a phase-rotation calculating unit 119.

The S/P units 112-1 to 112-M convert input channel data from serial data into parallel data. The DFT units 113-1 to 113-M apply discrete Fourier transform processing to the parallelized data. The transmission filter processing units 114-1 to 114-M apply filter processing to signals subjected to the discrete Fourier transform. The phase rotating units 115-1 to 115-M give phase rotation amounts calculated by the phase-rotation calculating unit 119 to the signals subjected to the filter processing. The frequency-arranging oversampler unit 116 arranges channel signals at an appropriate frequency and applies oversampling to the channel signals. The IDFT unit 117 applies inverse discrete Fourier transform processing to the signals subjected to the oversampling. The P/S unit 118 converts the signals subjected to the inverse discrete Fourier transform from parallel data into serial data. The phase-rotation calculating unit 119 calculates phase rotation amounts for channels based on the number of channels.

The operation of the transmission-signal generating unit 101 in this embodiment is explained. First, the S/P units 112-1 to 112-M receive inputs of channel data from the channels, subjects the channel data to serial/parallel conversion, and outputs parallelized data. Channel data generated by the multichannel-data generating unit 100 is $N_k$ ($1 \leq k \leq M$) signals subjected to digital modulation. As in the first embodiment, as a modulation system, in general, PSK, QAM, or the like is used. $N_k$ can be a value different depending on k or can be the same value ($N_1 = N_2 = \ldots = N_M = N$). Data encoded using an error correction code or the like or spread-encoded data such as CDMA can be used.

The DFT units 113-1 to 113-M apply discrete Fourier transform processing to the data parallelized by the S/P units 112-1 to 112-M. When $N_k$ is a power of 2, FFT (Fast Fourier Transform) processing with small computation can be performed.

The transmission filter processing units 114-1 to 114-M apply filter processing to the signals subjected to the Fourier transform. As a transmission filter used herein, a general RNF (root Nyquist filter) or NF (Nyquist filter) can be used, when the RNF or the NF is used, a roll-off ratio α is a parameter. However, any value can be used as the roll-off ratio. When α>0, the length of output signals from the transmission filter processing units 114-1 to 114-M is $(1+\alpha)N_k$. When $(1+\alpha)N_k$ is not an integer, in general, processing for carrying up or carrying down $(1+\alpha)N_k$ to a nearest integer is applied.

The phase rotating units 115-1 to 115-M give the phase rotation amounts calculated by the phase-rotation calculating unit 119 to the signals of the respective channels. A phase rotation amount to a signal of a kth channel can be represented as Formula (1).

$$\theta_n^{(k)} = e^{j2\pi\psi kn/N_L} \qquad (1)$$

In Formula (1), $N_L$ represents the number of signals input to the phase rotating units 115-1 to 115-M, Ψk represents a phase rotation amount with respect to the signal of the kth channel, a range of n is $0 \leq n \leq N_L - 1$, and a range of k is $0 \leq k \leq M - 1$.

Figure 12:
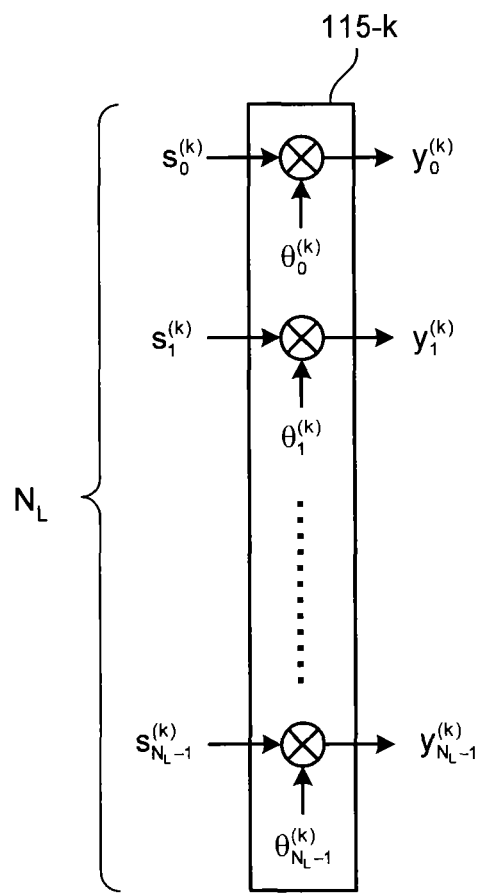
FIG. 12 is a diagram of a configuration example of a phase rotating unit.

FIG. 12 is a diagram of a configuration example of a kth phase rotating unit 115-k. A state in which the kth phase rotating unit 115-k receives an input of parallelized $N_L$ signals and gives the phase rotation amount indicated by Formula (1) to the signals is shown.

The phase rotation amount is not limited to the method explained above. For example, when Q is an integer and "x mod y" is a remainder obtained when an integer x is divided by an integer y, the phase rotating units 115-1 to 115-M can give a phase rotation amount indicated by Formula (2) below.

$$\theta_n^{(k)} = e^{j2\pi\psi k((n+Q) \bmod N_L)/N_L} \qquad (2)$$

Figure 13:
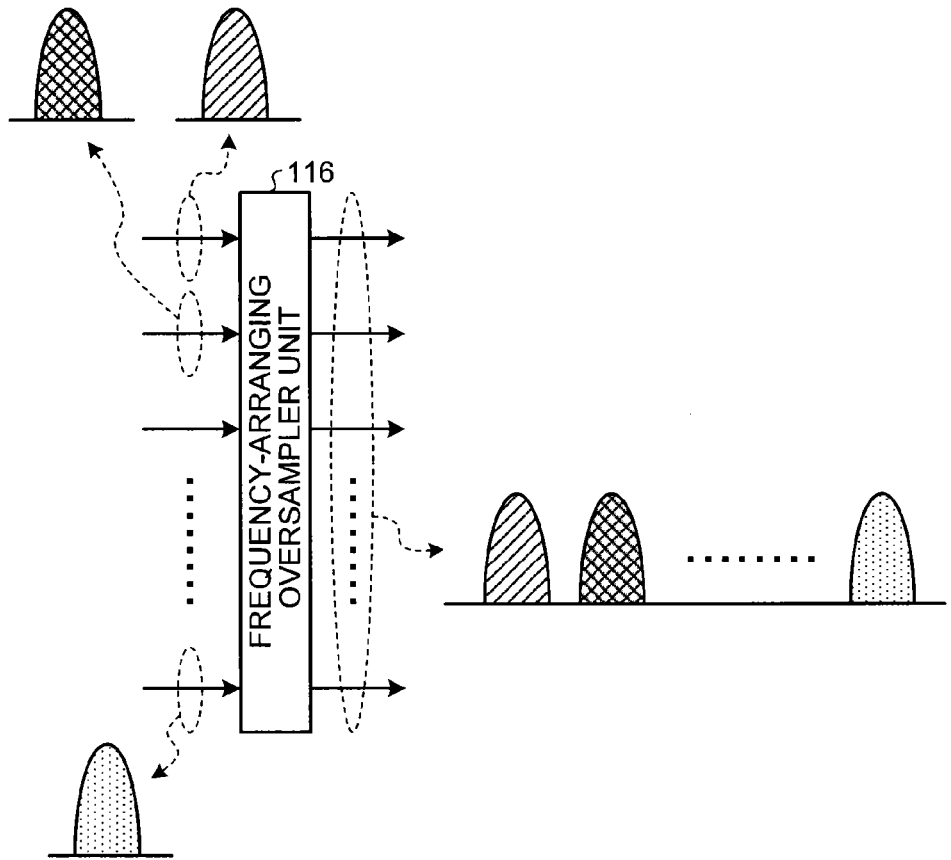
FIG. 13 is a diagram of an example of a frequency arrangement for channel signals.

The signals to which the phase rotating amounts are given by the phase rotating units 115-1 to 115-M are input to the phase-arrangement oversampler unit 116. The frequency-arranging oversampler unit 116 arranges the respective channel signals at an appropriate center frequency. The center frequency is a frequency set by the communication system. FIG. 13 is a diagram of an example of a frequency arrangement of the channel signals. The left side of FIG. 13 is an extraction of the section of the frequency-arranging oversampler unit 116 shown in FIG. 11. As shown on the right side of FIG. 13, the frequency-arranging oversampler unit 116 performs processing for arranging the input signals, to which the phase rotation amounts are given, at an appropriate center frequency. In an arrangement diagram of frequencies shown on the right side of FIG. 13, the abscissa indicates a frequency.

After arranging frequencies, the frequency-arranging oversampler unit 116 performs oversampling processing for increasing the number of input signals by L times. For example, when the number of input signals of the frequency-arranging oversampler unit 116 is represented as $MN_L$, the number of output signals is $LMN_L$. As an oversampling method, in general, for example, there is a method of inserting $(L-1)MN_L$ zeros in the input signals as disclosed in "Boaz Porat, "A Course in Digital Signal Processing" John Wiley and Sons, Inc". However, the oversampling method is not limited to this.

The IDFT unit 117 receives an input of the signals oversampled by the frequency-arranging oversampler unit 116 and applies inverse discrete Fourier transform processing to the signals. When the number of input signals is a power of 2, a conversion method with small computation such as IFFT (Inverse Fast Fourier Transform) can be used. The signals input to the IDFT unit 117 are signals for M channels. Therefore, a signal output by the IDFT unit 117 is a signal obtained by multiplexing the M channel signals.

The P/S unit 118 receives an input of the signal subjected to the inverse discrete Fourier transform processing and, after applying parallel/serial conversion processing to the signal, outputs the signal as a transmission signal. The output transmission signal is a transmission signal output from the transmission-signal generating unit 101 to the CP/ZP adding unit 102.

It is explained below how phase rotations for signals of the respective channels are related to peak power suppression of a multiplexed signal. In the explanation, as an example, the phase rotation amounts depend on the number of channels in a phase rotation calculation. In general, giving phase rotations to signals in the frequency domains is equivalent to giving circulation shifts or circulation timing offsets to the signals in the time domains as is it well known in, for example, the literature 'Boaz Porat, "A Course in Digital Signal Processing" John Wiley and Sons, Inc'. When the phase rotation amount is represented as m, the signals in frequency domains are represented as X, Y, and the corresponding signals in time domains are represented as x, Y, respectively, a relation between the frequency domains and the time domains can be represented by Formula (3) below. A range of n is $0 \leq n \leq N-1$ and a range of k is $0 \leq k \leq N-1$.

$$y_n = x_{(n-m) \bmod N} \Leftrightarrow Y_k = e^{-j2\pi km/N} X_k \qquad (3)$$

Figure 14:
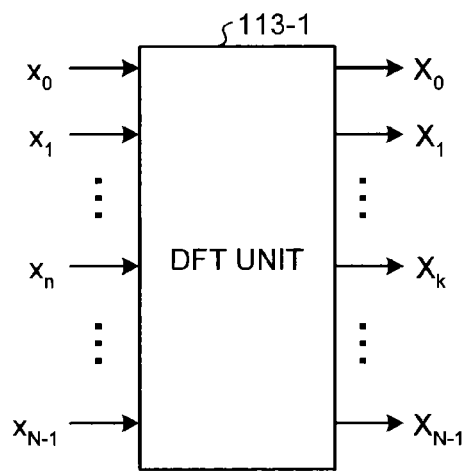
FIG. 14 is a diagram of a relation between input values and output values to and from a DFT unit.

FIG. 14 is a diagram of a relation between input values and output values to and from the DFT unit 113-1. The DFT unit 113-1 is shown as an example. However, the same applies to the other DFT units 113-2 to 113-M. As shown in FIG. 14, $X_k$ is a frequency domain signal of $x_n$ (an output signal obtained when $x_n$ is input to the DFT unit 113-1). Similarly, $Y_k$ is a frequency domain signal of $y_n$ (an output signal obtained when $y_n$ is input to the DFT unit 113-1).

When phase rotations are given to the signals of the respective channels in this way, timing offset occurs in the time domain. Therefore, it is possible to suppress a PAPR value.

For example, when $N_1 = N_2 = \ldots N_M = N$, to shift peak power occurrence places to reduce a PAPR value, the transmission-signal generating unit 101 gives different phase rotation amounts to the respective channels and prevent overlap of peak occurrence places. As in the first embodiment, in the case of two-channel transmission, a signal of a second channel only has to be transmitted with a phase rotation given to the signal to shift the signal by 0.5 symbol time. In the case of four-channel transmission, a signal of a second channel, a signal of a third channel, and a signal of a fourth channel only have to be transmitted with phase rotations given to the signals to shift the signals by 0.25 symbol time, 0.5 symbol time, and 0.75 symbol time, respectively.

The phase-rotation calculating unit 119 calculates phase rotation amounts for shifting timings of the channels in this way and outputs the phase rotation amounts to the phase rotating units 115-1 to 115-M. The phase rotating units 115-1 to 115-M give the received phase rotation amounts to the data. Consequently, it is possible to reduce a PAPR value of a multiplexed signal.

The phase rotation amounts can be determined freely. In the transmission-signal generating unit 101 shown in FIG. 11, an input value to the phase-rotation calculating unit 119 is the number of channels (M). However, the input value is not limited to this. For example, the phase rotation amounts can be set based on a value suitable for the parameters of the transmission filter, the number of oversamples, and the number of symbols. The phase rotation amounts only have to be set based on parameters fixed by the communication system or information known in the reception apparatus rather than parameters that always change such as data.

Even when $N_1 = N_2 = \ldots N_M = N$, it is possible to use different numbers of symbols in the respective channels. For example, when the number of symbols is represented as D (D<N), if the number of symbols D is transmitted from the transmission apparatus to the reception apparatus, it is possible to apply the processing in this embodiment by transmitting the number of symbols D with a pseudo symbol of a "N-D" symbol inserted in the number of symbols D.

As explained above, in this embodiment, in the transmission apparatus, the phase-rotation calculating unit 119 calculates different phase rotation amounts for a plurality of channels based on parameters known in the communication system. The phase rotating units 115-1 to 115-M give phase rotation amounts to channel data. The P/S unit 118 multiplexes signals to which the phase rotation amounts are given and generates a transmission signal. Consequently, it is possible to shift a peak power occurrence place in the transmission signal of multichannel transmission. Therefore, it is possible to reduce a PAPR value of the transmission signal compared with a PAPR value of a transmission signal obtained when the phase rotation amounts are not inserted.

Fifth Embodiment.

In a fifth embodiment, the transmission-signal generating unit 101 includes IDFT units for respective channels. Differences from the fourth embodiment are explained.

Figure 15:
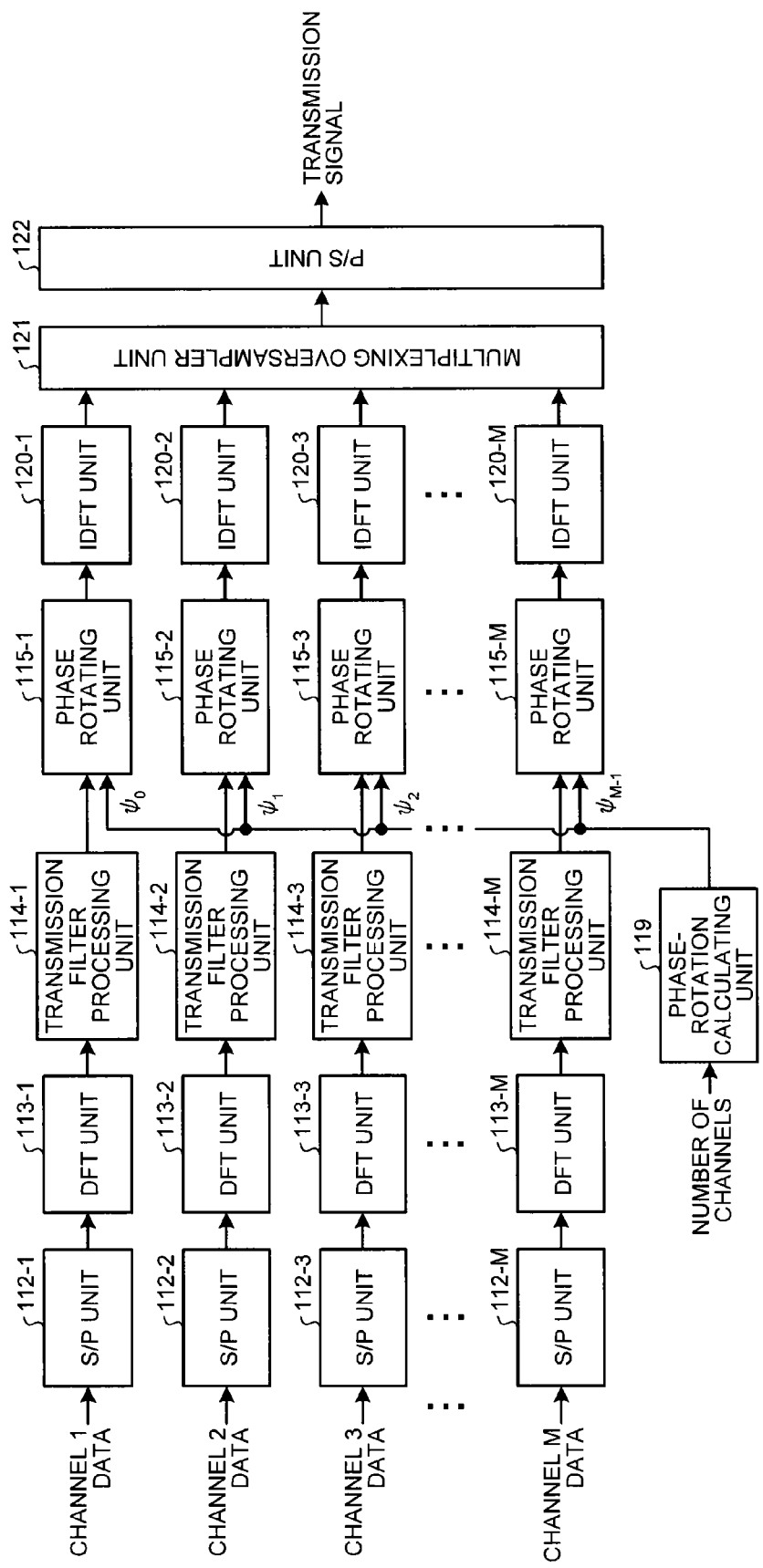
FIG. 15 is a diagram of a configuration example of a transmission-signal generating unit.

FIG. 15 is a diagram of a configuration example of the transmission-signal generating unit 101. The transmission-signal generating unit 101 includes the S/P units 112-1 to 112-M, the DFT units 113-1 to 113-M, the transmission filter processing units 114-1 to 114-M, the phase rotating units 115-1 to 115-M, IDFT units 120-1 to 120-M, a multiplexing oversampler unit 121, a P/S unit 122, and the phase-rotation calculating unit 119. Compared with the fourth embodiment (see FIG. 11), the transmission-signal generating unit 101 is different in that the transmission-signal generating unit 101 includes the IDFT units 120-1 to 120-M for the respective channels instead of the IDFT unit 117 and includes the multiplexing oversampler unit 121 instead of the frequency-arranging oversampler unit 116.

The IDFT units 120-1 to 120-M apply inverse discrete Fourier transform to signals to which phase rotation amounts are given. The multiplexing oversampler unit 121 multiplexes the signals subjected to the inverse discrete Fourier transform and applies oversampling to the signals. The P/S unit 122 subjects the signals subjected to the oversampling to parallel/serial conversion.

The operation of the transmission-signal generating unit 101 in this embodiment is explained. The operations of the S/P units 112-1 to 112-M, the DFT units 113-1 to 113-M, the transmission filter processing units 114-1 to 114-M, and the phase rotating units 115-1 to 115-M are the same as the operations in the fourth embodiment. The IDFT units 120-1 to 120-M apply, for the respective channels, inverse discrete Fourier transform processing to the signals to which the phase rotation amounts are given by the phase rotating units 115-1 to 115-M. As in the fourth embodiment, when the number of input signals to the IDFT units 120-1 to 120-M is a power of 2, a conversion method with small computation such as IFFT can be used. In the phase rotating units 115-1 to 115-M, frequencies to be treated can be reduced compared with the IDFT unit 117 in the fourth embodiment (see FIG. 11). Therefore, it is possible to simplify the configuration of the phase rotating units 115-1 to 115-M.

The multiplexing oversampler unit 121 receives an input of the signals subjected to the inverse discrete Fourier transform and applies multiplexing processing and oversampling processing to the signals. The oversampling processing is the same as the oversampling processing in the fourth embodiment. As in the case of the phase rotating units 115-1 to 115-M, in the multiplexing oversampler unit 121, frequencies to be treated can be reduced compared with the frequency-arranging oversampler unit 116 in the fourth embodiment (see FIG. 11). Therefore, it is possible to simplify the configuration of the multiplexing oversampler unit 121.

The P/S unit 122 receives an input of the oversampled signals, and after applying parallel/serial conversion processing to the signals, outputs the signals as a transmission signal. The output transmission signal is a transmission signal output from the transmission-signal generating unit 101 to the CP/ZP adding unit 102.

As in the fourth embodiment, the phase-rotation calculating unit 119 calculates the phase rotation amounts based on the number of channels M. However, the phase rotation amounts can be set based on a value suitable for the parameters of the transmission filter, the number of oversamples, and the number of symbols. The phase rotation amounts only has to be set based on parameters fixed by the communication system or information known in the reception apparatus.

As explained in the first embodiment, in general, as a modulation system, PSK, QAM, or the like is used. Data encoded using an error correction code or the like or spread-encoded data such as CDMA can be used. The oversampling processing can also be performed before the IDFT units 120-1 to 120-M rather than being performed in the multiplexing oversampler unit 121. In this case, M oversampling units are necessary before the IDFT units 120-1 to 120-M. The multiplexing oversampler unit 121 performs only signal multiplication.

As explained above, in this embodiment, the transmission-signal generating unit 101 includes the IDFT units 120-1 to 120-M for the respective channels. In this case, it is possible to obtain effects equivalent to the effects of the fourth embodiment. Further, it is possible to simplify the configurations of the phase rotating units 115-1 to 115-M and the multiplexing oversampler unit 121.

Sixth Embodiment.

In a sixth embodiment, a PAPR value of a transmission signal at the current phase rotation amount is measured and transfer rotation amounts are calculated using information concerning the PAPR value. Differences from the fourth embodiment are explained.

Figure 16:
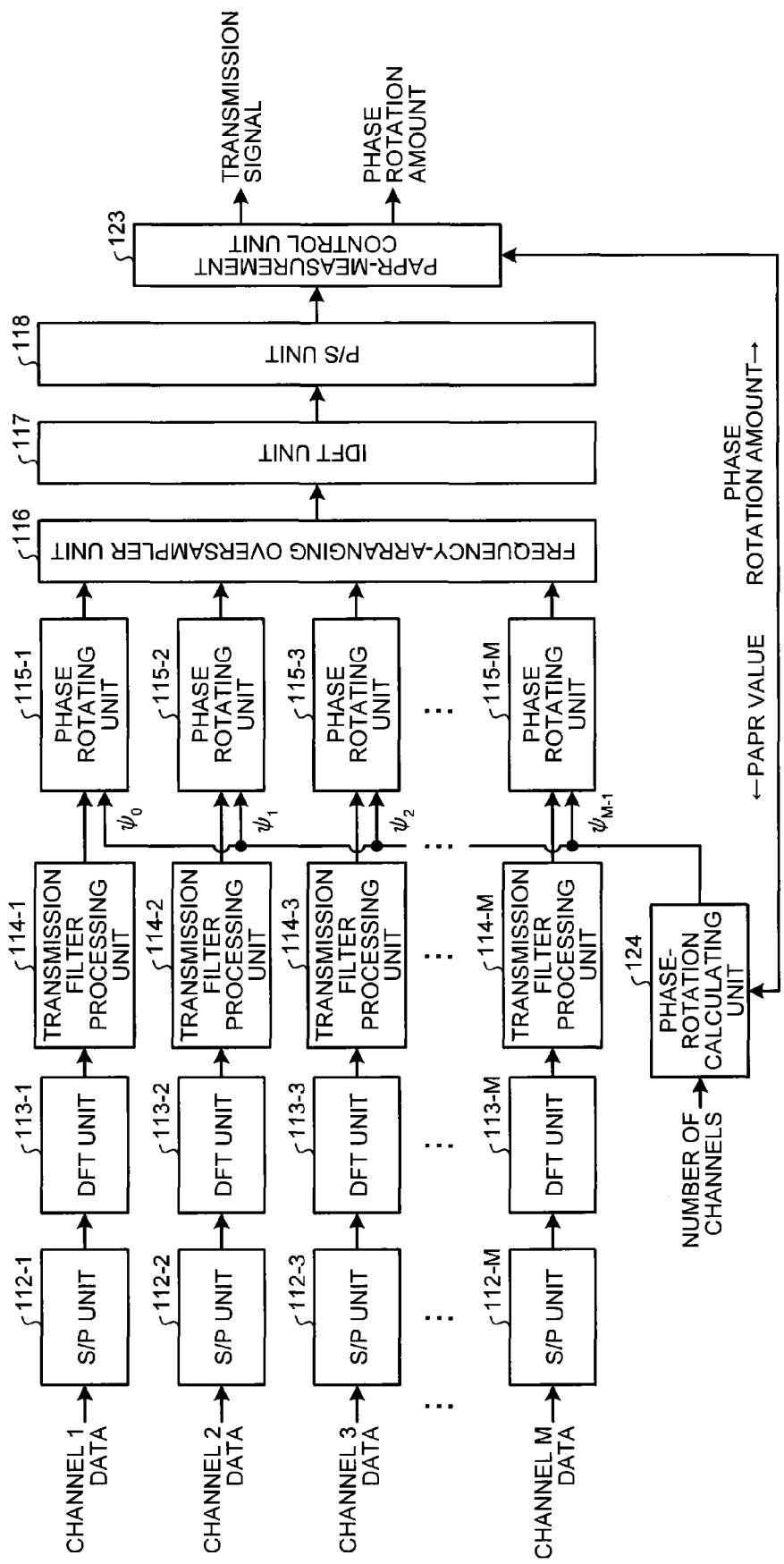
FIG. 16 is a diagram of a configuration example of the transmission-signal generating unit.

FIG. 16 is a diagram of a configuration example of the transmission-signal generating unit 101. The transmission-signal generating unit 101 includes the S/P units 112-1 to 112-M, the DFT units 113-1 to 113-M, the transmission filter processing units 114-1 to 114-M, the phase rotating units 115-1 to 115-M, the frequency-arranging oversampler unit 116, the IDFT unit 117, the P/S unit 118, a PAPR-measurement control unit 123, and a phase-rotation calculating unit 124.

The PAPR-measurement control unit 123 measures a PAPR value of a multiplexed transmission signal and notifies the phase-rotation calculating unit 124 of the PAPR value. The phase-rotation calculating unit 124 calculates, based on information concerning the number of channels and the PAPR value, phase rotation amounts for the phase rotating units 115-1 to 115-M and outputs the phase rotation amounts.

In this embodiment, the PAPR-measurement control unit 123 measures a PAPR value of a transmission signal and notifies the phase-rotation calculating unit 124 of the PAPR value. The phase-rotation calculating unit 124 calculates, based on the number of channels and the PAPR value, phase rotation amounts with which the PAPR value is minimized.

The phase rotation amounts sometimes depend on data. Therefore, the PAPR-measurement control unit 123 acquires information concerning phase rotation amounts ($\Psi_k$:

$0 \leq k \leq M-1$) from the phase-rotation calculating unit 124 and transmits the information concerning the phase rotation amounts to the reception apparatus together with the transmission signal. There is no limitation concerning a method of transmitting the information concerning the phase rotation amounts. It is possible to transmit the information concerning the phase rotation amounts using another channel or frame different from a channel or a frame for the transmission signal.

The above explanation is based on the transmission apparatus in the fourth embodiment. However, the explanation can be applied to the transmission apparatus in the fifth embodiment as well.

As explained above, in this embodiment, the phase-rotation calculating unit 124 further acquires information concerning the current PAPR value and calculates phase rotation amounts for the phase rotating units 115-1 to 115-M such that the PAPR value is minimized. Consequently, when the PAPR value increases, it is possible to immediately reduce the PAPR value.

Seventh Embodiment.

In this embodiment, a reception apparatus included in a communication system together with the transmission apparatus in the fourth to sixth embodiments is explained.

Figure 17:
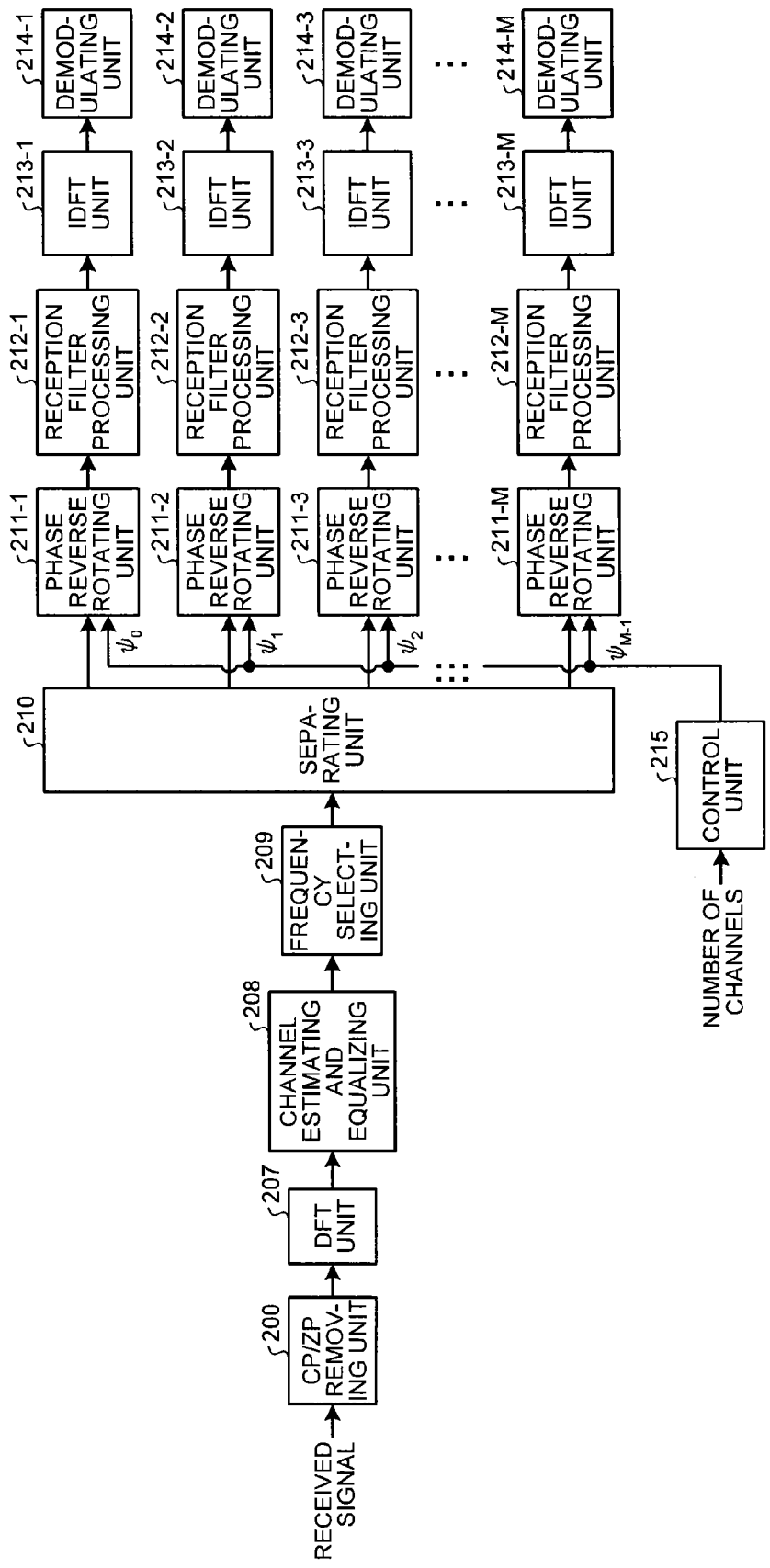
FIG. 17 is a diagram of a configuration example of a reception apparatus.

FIG. 17 is a diagram of a configuration example of the reception apparatus. The reception apparatus includes the CP/ZP removing unit 200, a DFT unit 207, a channel estimating and equalizing unit 208, a frequency selecting unit 209, a separating unit 210, phase reverse rotating units 211-1 to 211-M, reception filter processing units 212-1 to 212-M, IDFT units 213-1 to 213-M, demodulating units 214-1 to 214-M, and a control unit 215.

The DFT unit 207 applies discrete Fourier transform processing to a received signal. The channel estimating and equalizing unit 208 applies channel estimation and equalization processing to the received signal. The frequency selecting unit 209 separates the received signal in frequency domains in cooperation with the separating unit 210. The phase reverse rotating units 211-1 to 211-M apply phase reverse rotation processing to the divided signals based on information concerning phase rotation amounts acquired from the control unit 215. The reception filter processing units 212-1 to 212-M apply filter processing to the signals subjected to the phase reverse rotation processing. The IDFT units 213-1 to 213-M apply inverse discrete Fourier transform processing to the signals subjected to the filter processing. The demodulating units 214-1 to 214-M demodulate the signals. The control unit 215 calculates phase rotation amounts based on information concerning the number of channels, which is information known in a digital communication system in which the reception apparatus is included together with the transmission apparatus, and outputs the phase rotation amounts to the phase reverse rotating units 211-1 to 211-M.

The operation of the reception apparatus is explained. First, the CP/ZP removing unit 200 removes a CP or a ZP from a received signal. The DFT unit 207 applies discrete Fourier transform processing to the received signal. The channel estimating and equalizing unit 208 applies channel estimation and equalization processing to the received signal and removes interference.

Figure 18:
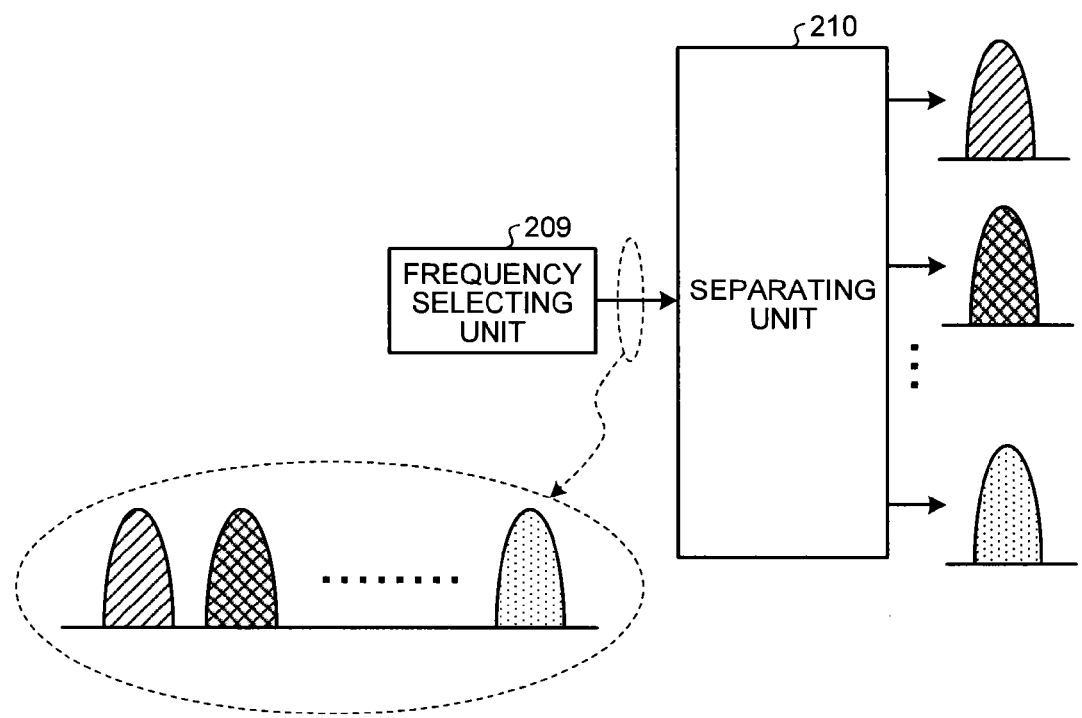
FIG. 18 is a diagram of frequency division processing.

The frequency selecting unit 209 and the separating unit 210 divide the received signal into respective channels in the frequency domains. FIG. 18 is a diagram of frequency division processing. The frequency selecting unit 209 and the separating unit 210 of the reception apparatus shown in FIG. 17 are shown. In the transmission apparatus, the frequency arrangement shown in FIG. 13 is performed. In the reception apparatus, processing opposite to the frequency arrangement, i.e., processing for obtaining received signal for the respective channels is performed in the frequency selecting unit 209 and the separating unit 210.

Subsequently, the phase reverse rotating units 211-1 to 211-M apply, in the respective frequency domains, phase reverse rotation processing to the received signals based on information concerning phase rotation amounts. Phases of demodulated signals are disordered unless a phase reverse rotation is not given. Therefore, it is necessary to give, on the reception apparatus side, a rotation opposite to a rotation given by the transmission apparatus. Phase rotation amounts used in the phase reverse rotating units 211-1 to 211-M are calculated and output by the control unit 215.

In FIG. 17, the control unit 215 calculates phase rotation amounts based on the number of channels using a calculation method same as the calculation method in the transmission apparatus. However, the calculation of phase rotation amounts is not limited to this. As explained in the fourth to sixth embodiments, when other known parameters (the parameters of the transmission filter, the number of oversamples, the number of symbols, etc.) are used in the transmission apparatus, the control unit 215 calculates phase rotation amounts using the same kinds of parameters. It is set in advance in the communication system which parameters are used. Consequently, the reception apparatus stores the parameters, which depend on the communication system, in a not-shown memory and refers to the parameters. Therefore, the reception apparatus does not need to acquire information concerning parameters from the transmission apparatus every time the reception apparatus receives a signal.

As in the case of the sixth embodiment, when the transmission apparatus changes phase rotation amounts as appropriate based on the current PAPR value, the control unit 215 can also receive the phase rotation amounts from the transmission apparatus and output the phase rotation amounts every time the transmission apparatus changes the phase rotation amounts. Because the phase reverse rotation processing is performed based on the actual phase rotation amounts, it is possible to perform the phase reverse rotation processing at high accuracy.

In the reception apparatus, after the phase reverse rotation processing, in the respective channels, the reception filter processing units 212-1 to 212-M apply reception filter processing to the received signals. The IDFT units 213-1 to 213-M apply inverse discrete Fourier transform processing to the received signals. The demodulating units 214-1 to 214-M demodulate the received signals to obtain channel data. As a demodulation system, an appropriate demodulation system is used according to an error correction code, a spreading code, and a modulation system used in the transmission apparatus.

As explained above, in this embodiment, in the reception apparatus, the control unit 215 calculates phase rotation amounts based on information same as the information in the transmission apparatus. The phase reverse rotating units 211-1 to 211-M remove the phase rotation amounts from a received signal. Consequently, in the reception apparatus, it is possible to remove different phase rotation amounts inserted for the respective channels. Therefore, it is possible to align phases of demodulated signals and obtain data generated by the transmission apparatus.

Eighth Embodiment.

In an eighth embodiment, a relay or a relay station (hereinafter collectively referred to as relay apparatus) to which the transmission apparatus explained above is applied is explained.

In the transmission apparatus explained in the first, second, and fourth to sixth embodiments, data generation is performed in the own apparatus and transmission timing is shifted for the generated data. However, as in the relay apparatus, it is possible to shift transmission timing for received data without performing data generation in the own apparatus. In this case, the relay apparatus plays a role of amplifying the power of a received signal and relaying the received signal.

Figure 19:
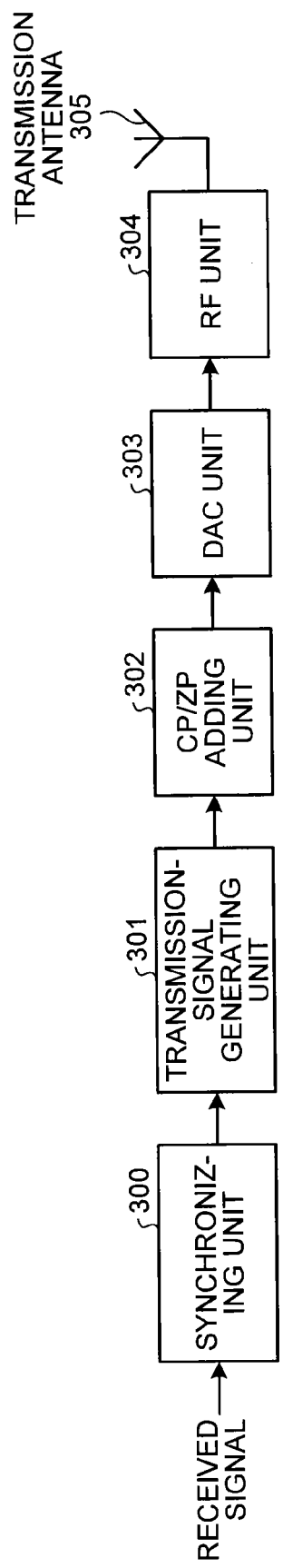
FIG. 19 is a diagram of a configuration example of a relay apparatus.

FIG. 19 is a diagram of a configuration example of the relay apparatus. The relay apparatus includes a synchronizing unit 300, a transmission-signal generating unit 301, a CP/ZP adding unit 302, a DAC unit 303, an RF unit 304, and a transmission antenna 305.

The synchronizing unit 300 performs synchronization of symbol timing and frame timing using an input signal and divides a received signal into a plurality of channels. Specifically, the synchronizing unit 300 performs operation same as the operation of the reception apparatus in the third embodiment (see FIG. 10) and the operation of the reception apparatus in the seventh embodiment (see FIG. 17).

The transmission-signal generating unit 301, the CP/ZP adding unit 302, the DAC unit 303, the RF unit 304, and the transmission antenna 305 respectively perform kinds of processing same as the processing performed by the transmission-signal generating unit 101, the CP/ZP adding unit 102, the DAC unit 103, the RF unit 104, and the transmission antenna 105. The transmission-signal generating unit 301 performs the operation of the transmission-signal generating unit 101 explained in the first, second, and fourth to sixth embodiments.

When the relay apparatus includes the configuration of the transmission-signal generating unit 110 and the reception apparatus shown in FIGS. 10 and 17, the function of the timing-offset calculating unit 109 (or 111) and the function of the control unit 206 are common or the function of the phase-rotation calculating unit 119 (or 124) and the function of the control unit 215 are common. In this case, one of the configuration of the transmission-signal generating unit 101 and the configuration of the reception apparatus can be included and the other can be removed. For example, if the timing-offset calculating unit 109 includes the function of the control unit 206 as well, the control unit 206 can be removed. Therefore, it is possible to simplify the configuration of the relay apparatus.

As explained above, in this embodiment, in the relay apparatus, processing for shifting transmission timings of respective channels is applied to received data. Consequently, in the relay apparatus, as in the transmission apparatus, it is possible to reduce a PAPR value of a signal output by the own apparatus.

In all the embodiments, for simplification of explanation, a single antenna communication system (a communication system that uses one antenna for transmission) is explained as an example. However, the present invention is not limited to this. The present invention can be used in a multi-antenna system such as a MIMO communication system described in the literature 'J. Mietzner et al., "Multiple-antenna techniques for wireless communications—a comprehensive literature survey", IEEE Commun. Surveys & Tutorials, vol. 11, no. 2, Second Quarter 2009, pp. 87 to 105'.

The communication system including the transmission apparatus and the reception apparatus explained above is not limited to radio communication and can be applied to a communication apparatus including wire communication. The communication system can be applied to encoded data. The transmission apparatus and the reception apparatus are not limited to the configurations explained in the embodiments and the application to the relay apparatus explained in the eighth embodiment and can be adapted to combinations of various modules. In the communication system, in the respective channels, not only data but also a system control signal, a pilot signal, which is a signal known to the reception side, and the like can be used. It is possible to reduce a PAPR value using the present invention.

As explained above, the transmission apparatus according to the present invention is useful for communication in a multipath environment and, in particular, suitable when multichannel communication is performed.

REFERENCE SIGNS LIST 100 multichannel-data generating unit
101 transmission-signal generating unit
102 CP/ZP adding unit
103 DAC unit
104 RF unit
105 transmission antenna
106-1 to 106-M transmission filter processing units
107-1 to 107-M timing offset units
108 multiplexing unit
109, 111 timing-offset calculating units
110, 123 PAPR-measurement control units
112-1 to 112-M S/P units
113-1 to 113-M DFT units
114-1 to 114-M transmission filter processing units
115-1 to 115-M phase rotating units
116 frequency-arranging oversampler unit
117, 120-1 to 120-M IDFT units
118, 122 P/S units
119, 124 phase-rotation calculating units
121 multiplexing oversampler unit
200 CP/ZP removing unit
201, 208 channel estimating and equalizing units
202 synchronizing unit
203, 210 separating units
204-1 to 204-M, 212-1 to 212-M reception filter processing units
205-1 to 205-M, 214-1 to 214-M demodulating units
206, 215 control units
207 DFT unit
209 frequency selecting unit
211-1 to 211-M phase reverse rotating units
213-1 to 213-M IDFT units
300 synchronizing unit
301 transmission-signal generating unit
302 CP/ZP adding unit
303 DAC unit
304 RF unit
305 transmission antenna

The invention claimed is:

1. A transmission apparatus included in a communication system together with a reception apparatus and configured to multiplex data from M (M is a natural number equal to or larger than 2) channels and transmit the data to the reception apparatus, the transmission apparatus comprising:
   M timing offset units configured to respectively receive inputs of the data from the different channels and insert designated timing offset values in the input data;
   a multiplexing unit configured to multiplex the M data subjected to the timing offset and output a multiplexed signal; and
   a timing-offset calculating unit configured to calculate, based on a known value based on a number of channels in the communication system, different timing offset values for the respective M timing offset units and output the calculated timing offset values to the respective timing offset units, the timing-offset calculating unit setting an interval between the different timing offset values based on a time for one symbol and the number of channels.

2. The transmission apparatus according to claim 1, wherein the timing-offset calculating unit sets the interval between the different timing offset values to Ts/M, where M is the number of channels and Ts is the time for one symbol.

3. The transmission apparatus according to claim 1, wherein the timing-offset calculating unit calculates the timing offset values based on a number of symbols included in the respective data.

4. The transmission apparatus according to claim 1, further comprising M transmission filter units configured to apply filter processing to the data not input to the timing offset units yet, wherein
the timing-offset calculating unit calculates the timing offset values based on parameters of filters in the transmission filter units.

5. The transmission apparatus according to claim 1, further comprising a PAPR measuring unit configured to measure a PAPR value (a peak to average power ratio) of the multiplexed signal output from the multiplexing unit and output the PAPR value to the timing-offset calculating unit, wherein
the timing-offset calculating unit further receives an input of the PAPR value and calculates the timing offset values for the timing offset units such that the PAPR value decreases.

6. The transmission apparatus according to claim 5, wherein
the timing-offset calculating unit outputs the calculated timing offset values to the PAPR measuring unit, and
the PAPR measuring unit outputs the acquired timing offset values to the reception apparatus.

7. A reception apparatus included in a communication system together with a transmission apparatus and configured to receive, from the transmission apparatus, a multiplexed signal obtained by multiplexing data of M (M is a natural number equal to or larger than 2) channels, the reception apparatus comprising:
a synchronizing unit configured to remove designated timing offset values from the multiplexed signal;
a separating unit configured to separate the multiplexed signal, from which the timing offset values are removed, into M data for the respective channels; and
a control unit configured to calculate the timing offset values based on a known value based on a number of channels in the communication system and output the timing offset values to the synchronizing unit, the control unit setting an interval between the different timing offset values based on a time for one symbol and the number of channels.

8. The reception apparatus according to claim 7, wherein the control unit sets the interval between the different timing offset values to Ts/M, where M is the number of channels and Ts is the time for one symbol.

9. The reception apparatus according to claim 7, wherein the control unit calculates the timing offset values based on a number of symbols included in the respective data.

10. The reception apparatus according to claim 7, wherein, when the transmission apparatus includes transmission filter units, the control unit calculates the timing offset values based on parameters of filters in the transmission filter units.

11. The reception apparatus according to claim 7, wherein the control unit outputs the timing offset values, which are received from the transmission apparatus, to the synchronizing unit.

12. A transmission apparatus included in a communication system together with a reception apparatus and configured to multiplex data from M (M is a natural number equal to or larger than 2) channels and transmit the data to the reception apparatus, the transmission apparatus comprising:
M parallel converting units configured to respectively receive inputs of the data from the different channels and convert the input data from serial data into parallel data;
M Fourier transform units configured to respectively receive inputs of the data from the different parallel converting units and apply Fourier transform processing to the input data;
M phase rotating units configured to respectively receive inputs of the data from the different Fourier transform units and add phase rotation amounts based on a number of channels to the input data;
a multiplexing unit configured to multiplex the M data to which the phase rotation amounts are added and output a multiplexed signal;
an inverse Fourier transform unit configured to apply inverse Fourier transform processing to the multiplexed signal;
a serial converting unit configured to convert a signal subjected to the inverse Fourier transform processing from parallel data into serial data; and
a phase-rotation calculating unit configured to calculate, based on a known value based on a number of channels in the communication system, different phase rotation amounts for the respective M phase rotating units and output the calculated phase rotation amounts to the respective phase rotating units.

13. The transmission apparatus according to claim 12, wherein the phase-rotation calculating unit calculates the phase rotation amounts to be added in a frequency domain so that an interval between different timing offset values of Ts/M occurs in a time domain, where M is the number of channels and Ts is a time for one symbol.

14. The transmission apparatus according to claim 12, wherein the phase-rotation calculating unit calculates the phase rotation amounts based on a number of symbols included in the respective data.

15. The transmission apparatus according to claim 12, further comprising M transmission filter units provided at a post stage of the Fourier transform units and configured to apply filter processing to the data not input to the phase rotating units yet, wherein
when the M phase rotating units respectively receive inputs of the data from the different transmission filter units,
the phase-rotation calculating unit calculates the phase rotation amounts based on parameters of filters in the transmission filter units.

16. The transmission apparatus according to claim 12, further comprising a PAPR measuring unit configured to measure a PAPR value (a peak to average power ratio) of the multiplexed signal output from the serial converting unit and output the PAPR value to the phase-rotation calculating unit, wherein
the phase-rotation calculating unit further receives an input of the PAPR value and calculates the phase rotation amounts for the phase rotating units such that the PAPR value decreases.

17. The transmission apparatus according to claim 16, wherein
the phase-rotation calculating unit outputs the calculated phase rotation amounts to the PAPR measuring unit, and
the PAPR measuring unit outputs the acquired phase rotation amounts to the reception apparatus.

18. A transmission apparatus included in a communication system together with a reception apparatus and configured to multiplex data from M (M is a natural number equal to or larger than 2) channels and transmit the data to the reception apparatus, the transmission apparatus comprising:
M parallel converting units configured to respectively receive inputs of the data from the different channels and convert the input data from serial data into parallel data;
M Fourier transform units configured to respectively receive inputs of the data from the different parallel converting units and apply Fourier transform processing to the input data;
M phase rotating units configured to respectively receive inputs of the data from the different Fourier transform units and add phase rotation amounts based on a number of channels to the input data;
M inverse Fourier transform units configured to respectively receive inputs of the data from the different phase rotating units and apply inverse Fourier transform processing to the input data;
a multiplexing unit configured to multiplex the M data subjected to the inverse Fourier transform and output a multiplexed signal;
a serial converting unit configured to convert the multiplexed signal from parallel data into serial data; and
a phase-rotation calculating unit configured to calculate, based on a known value based on a number of channels in the communication system, different phase rotation amounts for the respective M phase rotating units and output the calculated phase rotation amounts to the respective phase rotating units.

19. The transmission apparatus according to claim 18, wherein the phase-rotation calculating unit calculates the phase rotation amounts to be added in a frequency domain so that an interval between different timing offset values of Ts/M occurs in a time domain, where M is the number of channels and Ts is a time for one symbol.

20. The transmission apparatus according to claim 18, wherein the phase-rotation calculating unit calculates the phase rotation amounts based on a number of symbols included in the respective data.

21. The transmission apparatus according to claim 18, further comprising M transmission filter units provided at a post stage of the Fourier transform units and configured to apply filter processing to the data not input to the phase rotating units yet, wherein
when the M phase rotating units respectively receive inputs of the data from the different transmission filter units,
the phase-rotation calculating unit calculates the phase rotation amounts based on parameters of filters in the transmission filter units.

22. The transmission apparatus according to claim 18, further comprising a PAPR measuring unit configured to measure a PAPR value (a peak to average power ratio) of the multiplexed signal output from the serial converting unit and output the PAPR value to the phase-rotation calculating unit, wherein
the phase-rotation calculating unit further receives an input of the PAPR value and calculates the phase rotation amounts for the phase rotating units such that the PAPR value decreases.

23. The transmission apparatus according to claim 22, wherein
the phase-rotation calculating unit outputs the calculated phase rotation amounts to the PAPR measuring unit, and
the PAPR measuring unit outputs the acquired phase rotation amounts to the reception apparatus.

24. A reception apparatus included in a communication system together with a transmission apparatus and configured to receive, from the transmission apparatus, a multiplexed signal obtained by multiplexing data of M (M is a natural number equal to or larger than 2) channels, the reception apparatus comprising:
a separating unit configured to separate the multiplexed signal into M data for the respective channels;
M phase reverse rotating units configured to respectively receive inputs of the different separated data and remove designated phase rotation amounts; and
a control unit configured to calculate the phase rotation amounts based on a known value based on a number of channels in the communication system and output the calculated phase rotation amounts to the respective phase reverse rotating units, the control unit calculating the phase rotation amounts to be added in a frequency domain so that an interval between different timing offset values that is based on a time for one symbol and the number of channels, occurs in a time domain.

25. The reception apparatus according to claim 24, wherein the control unit calculates the phase rotation amounts to be added in the frequency domain so that the interval between different timing offset values of Ts/M occurs in the time domain, where M is the number of channels and Ts is the time for one symbol.

26. The reception apparatus according to claim 24, wherein the control unit calculates the phase rotation amounts based on a number of symbols included in the respective data.

27. The reception apparatus according to claim 24, wherein
when the transmission apparatus includes transmission filter units,
the control unit calculates the phase rotation amounts based on parameters of filters in the transmission filter units.

28. The reception apparatus according to claim 24, wherein the control unit outputs the phase rotation amounts, which are acquired from the transmission apparatus, to the respective phase reverse rotating units.

29. A relay apparatus configured to relay a multiplexed signal obtained by multiplexing data of M (M is a natural number equal to or larger than 2) channels in a communication system in which a transmission apparatus transmits the multiplexed signal and a reception apparatus receives the multiplexed signal, the relay apparatus comprising:
a synchronizing unit configured to remove timing offset values based on a number of channels from the multiplexed signal;
a separating unit configured to separate the multiplexed signal, from which the timing offset values are removed, into M data for the respective channels;
M timing offset units configured to respectively receive inputs of the different separated data and insert the designated timing offset values in the input data;
a multiplexing unit configured to multiplex the M data subjected to the timing offset and output the multiplexed signal; and
a timing-offset calculating unit configured to calculate, based on a known value based on a number of channels in the communication system, different timing offset values for the respective M timing offset units, output the calculated timing offset values to the respective timing offset units, and further output the timing offset values to the synchronizing unit, the timing-offset calculating unit setting an interval between the different timing offset values based on a time for one symbol and the number of channels.

30. The relay apparatus according to claim 29, wherein the timing-offset calculating unit sets the interval between the different timing offset values to Ts/M, where M is the number of channels and Ts is the time for one symbol.

31. A relay apparatus configured to relay a multiplexed signal obtained by multiplexing data of M (M is a natural number equal to or larger than 2) channels in a communication system in which a transmission apparatus transmits the multiplexed signal and a reception apparatus receives the multiplexed signal, the relay apparatus comprising:
 a separating unit configured to separate the multiplexed signal into M data for the respective channels;
 M phase reverse rotating units configured to respectively receive inputs of the different separated data and remove phase rotation amounts based on a number of channels;
 M parallel converting units configured to respectively receive inputs of the data from the different phase reverse rotating units and convert the input data from serial data into parallel data;
 M Fourier transform units configured to respectively receive inputs of the data from the different parallel converting units and apply Fourier transform processing to the input data;
 M phase rotating units configured to respectively receive inputs of the data from the different Fourier transform units and add phase rotation amounts based on a number of channels to the input data;
 a multiplexing unit configured to multiplex the M data to which the phase rotation amounts are added and output the multiplexed signal;
 an inverse Fourier transform unit configured to apply inverse Fourier transform processing to the multiplexed signal;
 a serial converting unit configured to convert a signal subjected to the inverse Fourier transform processing parallel data into serial data; and
 a phase-rotation calculating unit configured to calculate, based on a known value based on a number of channels in the communication system, different phase rotation amounts for the respective M phase rotating units and output the calculated phase rotation amounts to the respective phase rotating units, and further output the calculated phase rotation amounts to the respective phase reverse rotating units.

32. The relay apparatus according to claim 31, wherein the phase-rotation calculating unit calculates the phase rotation amounts to be added in a frequency domain so that an interval between the different timing offset values of Ts/M occurs in a time domain, where M is the number of channels and Ts is a time for one symbol.

\* \* \* \* \*